United States Patent
Petersen

(10) Patent No.: US 10,928,592 B2
(45) Date of Patent: Feb. 23, 2021

(54) SECTIONAL HOUSING FOR FIBER OPTIC SPLICES

(71) Applicant: COMMSCOPE TECHNOLOGIES LLC, Hickory, NC (US)

(72) Inventor: Cyle D. Petersen, Belle Plaine, MN (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/484,687

(22) PCT Filed: Feb. 8, 2018

(86) PCT No.: PCT/US2018/017414
§ 371 (c)(1),
(2) Date: Aug. 8, 2019

(87) PCT Pub. No.: WO2018/148402
PCT Pub. Date: Aug. 16, 2018

(65) Prior Publication Data
US 2020/0033535 A1 Jan. 30, 2020

Related U.S. Application Data

(60) Provisional application No. 62/456,327, filed on Feb. 8, 2017.

(51) Int. Cl.
*G02B 6/25* (2006.01)
*G02B 6/255* (2006.01)

(52) U.S. Cl.
CPC .................. *G02B 6/2558* (2013.01)

(58) Field of Classification Search
CPC ..... G02B 6/2558; G02B 6/443; G02B 6/4486
USPC ........................................... 385/99, 134, 147
See application file for complete search history.

(56) References Cited

U.S. PATENT DOCUMENTS

| 5,473,718 A | 12/1995 | Sommer |
| 6,249,636 B1* | 6/2001 | Daoud ................. G02B 6/4471 385/135 |
| 6,360,051 B1 | 3/2002 | Daoud |
| 6,533,472 B1 | 3/2003 | Dinh et al. |
| 7,228,047 B1* | 6/2007 | Szilagyi ............... G02B 6/3878 385/134 |

(Continued)

FOREIGN PATENT DOCUMENTS

| CN | 204331115 U | 5/2015 | |
| GB | 2 238 186 A | 5/1991 | |
| GB | 2269274 A | * 2/1994 | ............. H02G 15/14 |

OTHER PUBLICATIONS

International Search Report and Written Opinion of the International Searching Authority for International Patent Application No. PCT/US2018/017414 dated May 28, 2018, 13 pages.

(Continued)

*Primary Examiner* — Robert Tavlykaev
(74) *Attorney, Agent, or Firm* — Merchant & Gould P.C.

(57) ABSTRACT

Splice housings for distributing large numbers of optical fiber splices. In some examples, the splice housings can be pivoted relative to each other. In some examples, the splice housings include flexible splice holders configured to hold multiple splices for a first subset of optical fibers while allowing passage of a second subset of optical fibers through the splice holder.

26 Claims, 20 Drawing Sheets

(56) References Cited

U.S. PATENT DOCUMENTS

| | | | |
|---|---|---|---|
| 7,403,686 B1* | 7/2008 | Zervas | G02B 6/3801 |
| | | | 385/100 |
| 7,756,378 B2* | 7/2010 | Ruiz | G02B 6/4471 |
| | | | 385/135 |
| 8,737,786 B1 | 5/2014 | Compton | |
| 9,323,021 B2 | 4/2016 | Hodge et al. | |
| 2002/0064364 A1* | 5/2002 | Battey | G02B 6/4497 |
| | | | 385/136 |
| 2003/0039453 A1* | 2/2003 | Holmquist | G02B 6/3887 |
| | | | 385/86 |
| 2003/0210875 A1* | 11/2003 | Wagner | G02B 6/4472 |
| | | | 385/100 |
| 2005/0238292 A1 | 10/2005 | Barnes et al. | |
| 2005/0265672 A1* | 12/2005 | Theuerkorn | G02B 6/3894 |
| | | | 385/100 |
| 2011/0052131 A1 | 3/2011 | Park et al. | |
| 2013/0146355 A1 | 6/2013 | Strasser et al. | |
| 2013/0287360 A1* | 10/2013 | Beamon | G02B 6/4471 |
| | | | 385/136 |
| 2015/0355429 A1 | 12/2015 | Villegas et al. | |
| 2015/0370029 A1 | 12/2015 | Petersen et al. | |
| 2017/0038551 A1* | 2/2017 | Segsworth | G02B 6/4429 |

OTHER PUBLICATIONS

Extended European Search Report for corresponding European Patent Application No. 18751472.4 dated Oct. 22, 2020, 9 pages.

\* cited by examiner

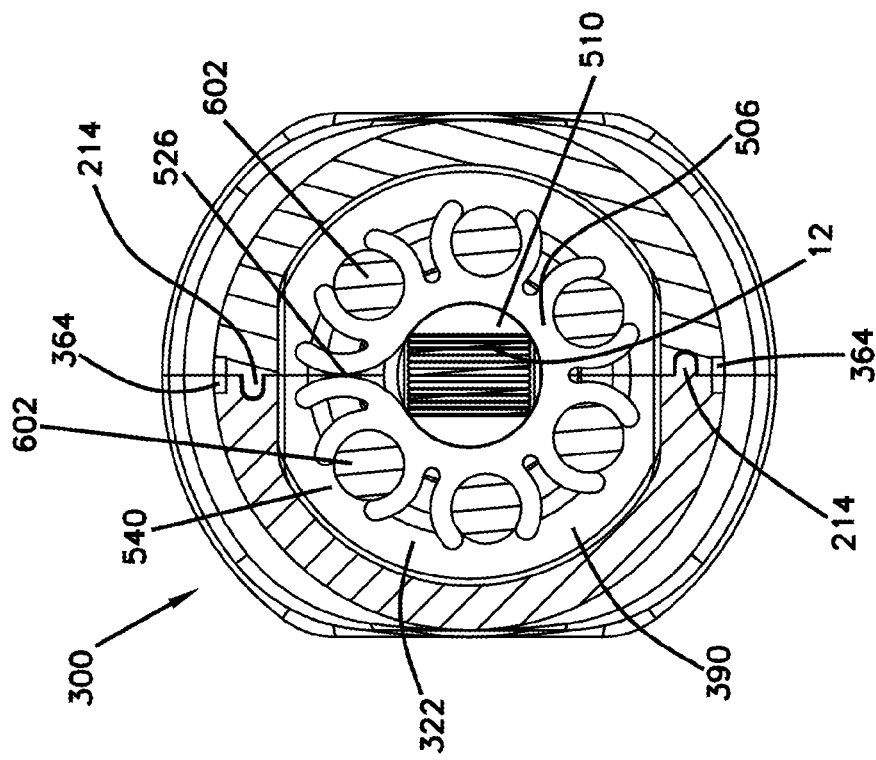
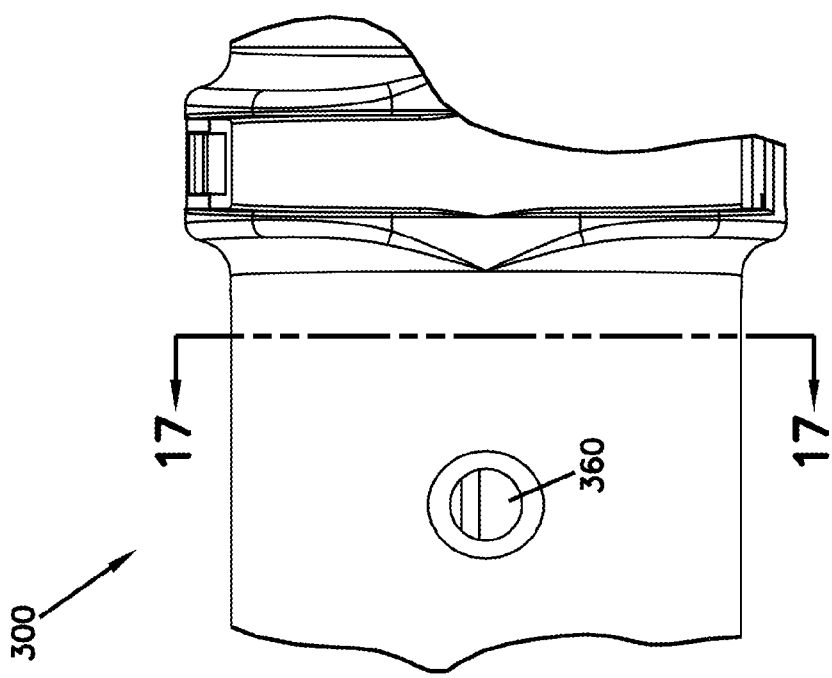

SECTIONAL HOUSING FOR FIBER OPTIC SPLICES

CROSS-REFERENCE TO RELATED APPLICATION

This application is a National Stage Patent Application of PCT/US2018/017414, filed on Feb. 8, 2018, which claims the benefit of U.S. Patent Application Ser. No. 62/456,327, filed on Feb. 8, 2017, the disclosures of which are incorporated herein by reference in their entireties. To the extent appropriate, a claim of priority is made to each of the above disclosed applications.

BACKGROUND

Telecommunications equipment containing optical fibers is known. Fiber optic cables that carry a plurality of optical fibers over distances to connect to equipment are also known. Some cables include large numbers of optical fibers for transmitting large amounts of data between a data provider and data customers. For example, a fiber optic trunk cable has a robust construction and can include many optical fibers. At or near an end (typically, the customer end) of the trunk cable, the fibers can be furcated at a termination device that can connect individual fibers or groups of fibers from the trunk cable to multiple telecommunications equipment destinations, e.g., to telecommunications equipment associated with a plurality of customers. Typically, towards the customer end of the trunk cable the ends of the fibers carried by the trunk cable are spliced on to connectorized cable stubs to provide an optical connection between the trunk cable and the desired telecommunications equipment.

SUMMARY

In general terms, the present disclosure is directed to a splice housing assembly and splice holder for a plurality of optical fibers carried by a cable, such as a trunk cable. The trunk cable can carry a plurality of individual and/or ribbonized optical fibers. The splice housing assembly can accommodate any type of optical fiber splice, including but not limited to fusion splices and mechanical splices.

In one aspect of the present disclosure, a splice housing assembly includes a plurality of splice housing modules coupled together to form the assembly. In some examples, each pair of adjacent splice housing modules are couplable by a ball and socket joint. In some examples, each of the splice housing modules accommodates splices for at least one, but less than all, of the optical fibers of a trunk cable.

Typically, splices require a protective element, such as a sleeve around the splice. Thus, each individual splice is often radially bulkier than the fibers and fiber stubs that are being spliced together. When a large number of fibers from the same cable, e.g., a trunk cable, require splicing, the additional bulk is cumulative, and can create an unwieldy large mass of splices that can be difficult or impossible to maneuver and protect. The splice housing assemblies of the present disclosure can alleviate these drawbacks of splicing a large number of fibers from the same cable by longitudinally staggering the splices along the axial lengths of the fibers. The individual fibers can be cleaved at different locations on the fibers, depending on the longitudinal location of the intended splice. Similarly, the lengths of the fiber stubs can be adjusted according to the longitudinal location within the splice assembly that the splice is to take place.

In another aspect of the present disclosure, a splice housing assembly includes a plurality of modules including a cable attachment module, a furcation module, and a plurality of splice housing modules, the cable attachment module being adapted to couple the assembly to the end of a trunk cable carrying a plurality of optical fibers, the furcation module being adapted to route individual fibers or groups of ribbonized or non-ribbonized fibers via furcation tubes, and the plurality of splice housing modules being disposed between the cable attachment module and the furcation module, each of the splice housing modules being adapted to accommodate splices for at least one, but less than all, of the optical fibers. In some examples, a first of the splice housing modules is coupled to the cable attachment module by a ball and socket joint, each pair of adjacent splice housing modules are coupled to each other by a ball and socket joint, and a second of the splice housing modules is coupled to the furcation module by a ball and socket joint. In some examples, the assembly can be pivoted with respect to a longitudinal axis of the trunk cable by actuating one or more of the ball and socket joints. In some examples, the ball and socket joints allow for a maximum curvature (i.e., a minimum bend radius) of the assembly, the maximum curvature being less than or equal to a predefined allowable operating curvature for the optical fibers. In some examples, some or all of the modules consist of complementary housing pieces that are reversibly fastened together, each module defining an interior cavity.

In some examples, each of the modules is defined by a shell, the shell having a central body portion. In some examples, the central body portion of each splice housing module is flanked on one side by a socket of a ball and socket joint, and on an opposing side by a ball of a ball and socket joint. In some examples the central body portion of the cable attachment module is flanked on one side by a ball of a ball and socket joint, and an opposing side by a plurality of crimping legs for crimping the outside of a trunk cable. In some examples, the central body portion of the furcation module is flanked on one side by a socket of a ball and socket joint, and on an opposing side by a furcation cap holder. In some examples, the shell of various modules, including one or more port covers of the furcation module, are made of a rigid material. Examples of such materials include thermoplastic polymers, such as polybutylene terephthalate. In some examples, the furcation cap is made from a metal or metal alloy, such as brass.

In a further aspect of the present disclosure a splice housing assembly includes a plurality of splice housing modules, each splice housing module defining an interior cavity, the interior cavity receiving a splice holder, the splice holder including a wall, the wall having an inner surface that defines a longitudinal bore and an outer surface that supports a plurality of longitudinally oriented channels arranged circumferentially around the wall, each channel being adapted to hold a splice. In some examples, each of the channels consists of a pair of flexibly resilient, spaced apart arms extending from the outer surface of the wall. In some examples, the wall is flexibly resilient and has a first end and an opposing second end forming an openable and closable junction, the junction being closed when the first end and the second end abut each other, and the junction being open when the first end and the second end are moved apart from each other forming a slot for accessing the interior bore.

In some examples, a plurality of fibers pass through the interior cavity of each of the splice housing modules, wherein, in each of the splice housing modules, a first subset of the plurality of fibers are spliced in one or more of the channels, and a second subset of the plurality of fibers pass through the longitudinal bore of the splice holder.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 16 is a view of a portion of part of a splice housing module of FIG. 14.

FIG. 17 is a cross-sectional view of the splice housing module of FIG. 16, taken along the line 17-17 in FIG. 16.

DETAILED DESCRIPTION

Figure 1:
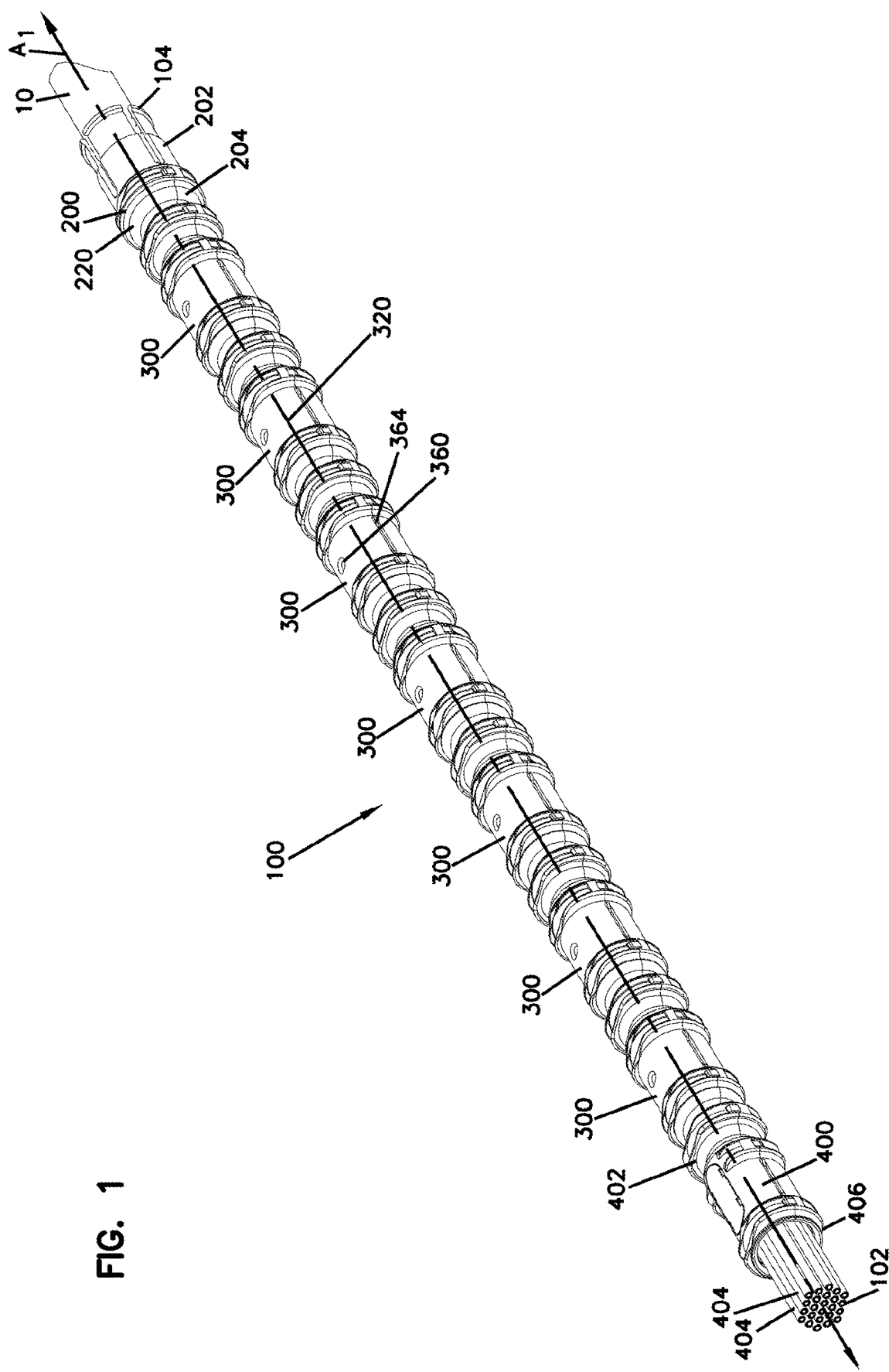
FIG. 1 is a perspective view of an example splice housing assembly in accordance with the present disclosure, the splice housing assembly being in a straight configuration and being coupled to a fiber optic trunk cable.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
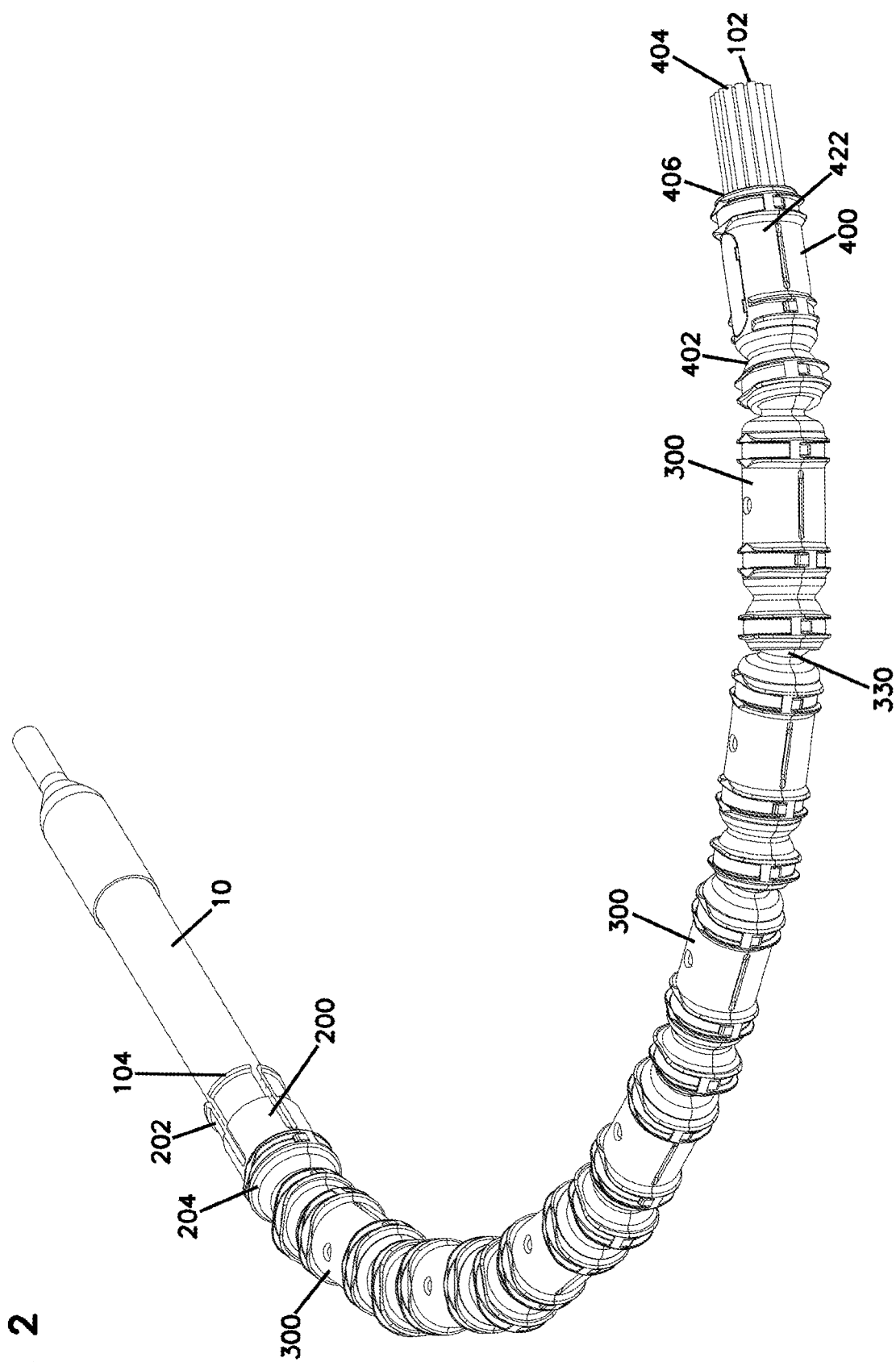
FIG. 2 is a perspective view of the splice housing assembly of FIG. 1, the splice housing assembly being in a curved configuration.

FIG. 1 illustrates a perspective view of an example splice housing assembly 100 in accordance with the present disclosure, the splice housing assembly being in a straight configuration and being coupled to an end of a fiber optic trunk cable 10. FIG. 2 is a perspective view of the splice housing assembly 100 of FIG. 1, the splice housing assembly 100 being in a curved configuration.

Referring to FIGS. 1-2, the splice housing assembly 100 includes a front end 102 and a back end 104 and a central longitudinal axis $A_1$. Throughout this disclosure, the terms "back" and "rear" and their respective grammatical variations will be used interchangeably.

The splice housing assembly 100 includes a cable attachment module 200, a plurality of splice housing modules 300, and a furcation module 400. In this example, seven splice housing modules 300 are depicted, however any number of splice housing modules can be included in the splice housing assembly.

A back portion 202 of the cable attachment module 200 is coupled to an end of the trunk cable 10. A rearmost splice housing module 300 (the splice housing module closest to the back end 104) is coupled to a front portion 204 of the cable attachment module. A back portion 402 of the furcation module 400 is coupled to the front-most splice housing module (the splice housing module closest to the front end 102). A plurality of furcation tubes 404 extend longitudinally forwards through an open front end 406 of the furcation module 400.

Between the front-most splice housing module 300 and the rearmost splice housing module 300, additional splice housing modules 300 are serially coupled together.

It should be appreciated that in an alternative example splice housing assembly (not shown) that includes just one splice housing module 300, a front portion of that splice housing module 300 is coupled to the furcation module 400, and a rear portion of the splice housing module 300 is coupled to the cable attachment module 200. In a further alternative splice housing assembly (not shown) that includes just two splice housing modules 300, a first of the two splice housing modules 300 is coupled to the furcation module 400, a second of the two splice housing modules 300 is coupled to the cable attachment module 200, and the two splice housing modules 300 are also coupled to each other.

Trunk cables are typically highly ruggedized and minimally bendable. The bendability of the splice housing assembly 100, as shown in FIG. 2, can effectively operate as an extension of the trunk cable, while having greater flexibility than the trunk cable. This greater flexibility can, for example, facilitate alignment and/or routing of optical fibers carried by the trunk cable with destination telecommunications equipment.

Figure 3A:
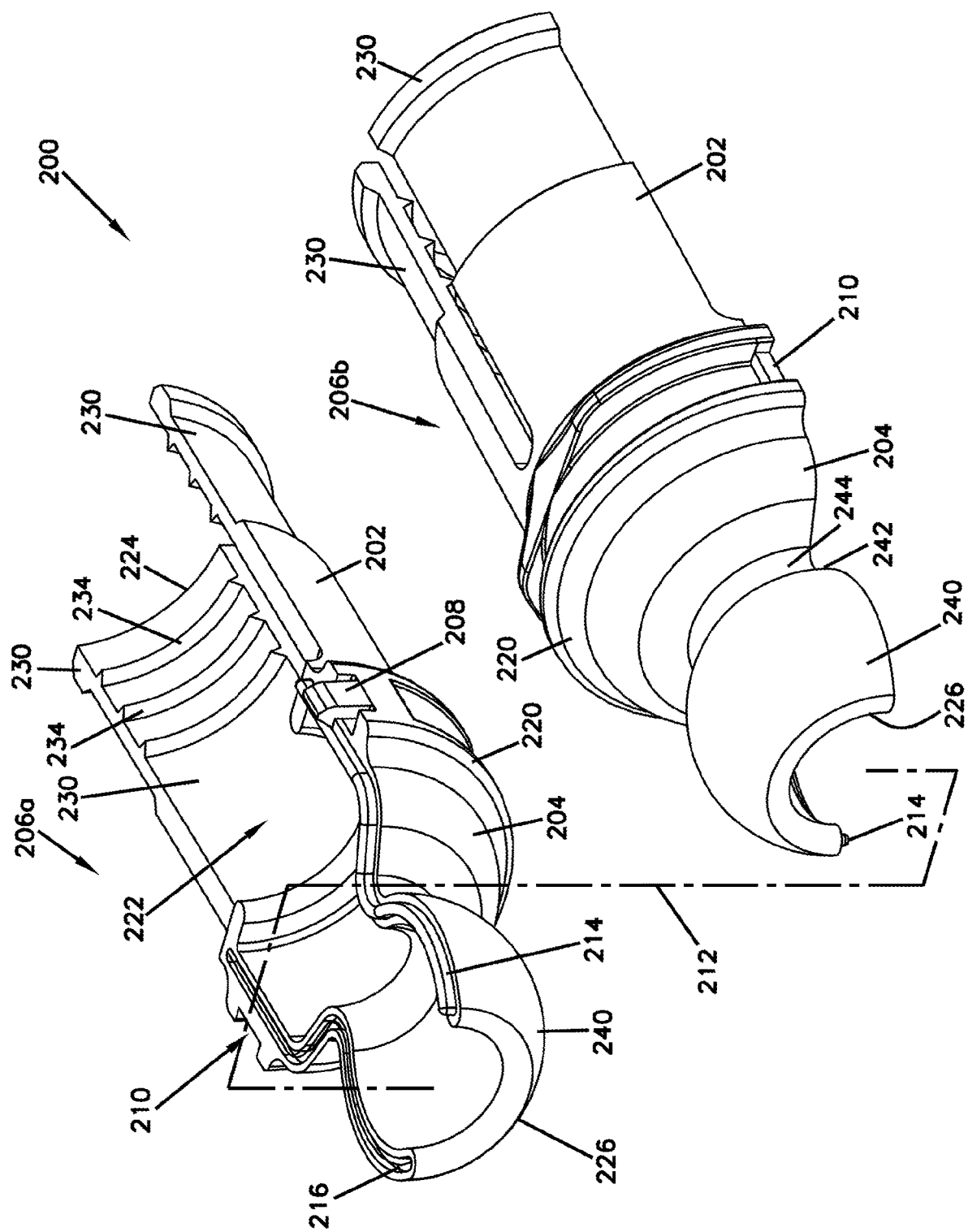
FIG. 3A is a perspective exploded view of an example cable attachment module of the splice housing assembly of FIG. 1.
Figure 3B:
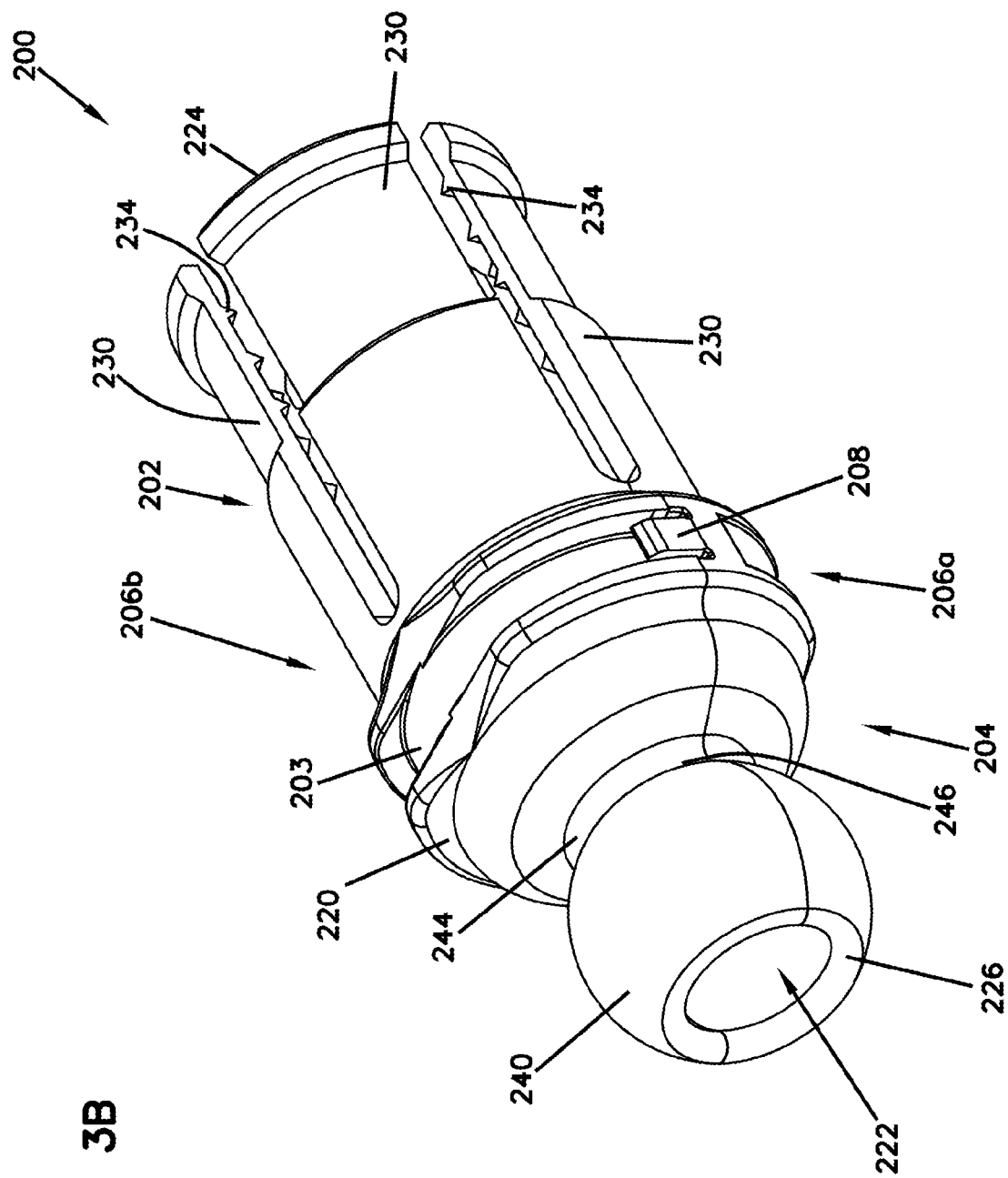
FIG. 3B is a perspective view of the cable attachment module of FIG. 3A in an assembled configuration.

FIG. 3A is a perspective exploded view of the cable attachment module 200 of the splice housing assembly 100 of FIG. 1. FIG. 3B is a perspective view of the cable attachment module 200 of FIG. 3A in an assembled configuration.

Referring to FIGS. 3A and 3B (collectively, FIG. 3), in this example, the cable attachment module 200 consists of two complementary pieces 206a and 206b. Though not required, in this example the two complementary pieces 206a and 206b are identical. Each of the pieces (206a, 206b) includes the rear portion 202 and the front portion 204 as described above. Each piece (206a, 206b) includes, on opposing sides, complementary fastening components 208 and 210 to fasten the two pieces (206a, 206b) together. Mating of the two pieces 206a and 206b is represented by the dashed line 212. In the example shown, the fastening components are a flexible latch 208 that lockingly snaps over a bar 210. The latch 208 of the piece 206a engages the bar 210 of the piece 206b, and vice versa.

In addition, in this example, each piece (206a, 206b) includes, on opposing sides, a ridge 214 and a complementary groove 216, the ridge 214 of one piece being configured to nest in the groove 216 of the other piece, and vice versa. In this example, the ridge 214 and the groove 216 generally follow a contour of the front portion 204. The ridge and groove coupling can enhance a fastening between the two pieces 206a and 206b and also provide a seal between the two pieces. In some examples, the groove 216 can be filled with an epoxy or other sealant to firmly join the two pieces 206a and 206b.

When the two pieces 206a and 206b are joined together to form the cable attachment module 200, the cable attachment module 200 is a shell 220 defining an interior cavity 222. The cavity 222 has on open back end 224 and an open front end 226. Thus, optical fibers can enter the cavity 222 at the open back end 224, continue through the cavity 222 and exit at the open front end 226.

The cavity 222 within the rear portion 202 of the cable attachment module 200 is configured to receive an end (e.g., the customer end) of the trunk cable 10. The rear portion 202 includes a plurality of crimp legs 230 configured to be crimped on a terminal portion of the trunk cable 10. In this example, an inner surface 232 of the crimp legs 230 includes one or more ribs 234 protruding into the cavity 222. The ribs 234 are configured to grip the outer layer (e.g., the jacket) of the trunk cable 10 and help to prevent separation of the cable attachment module 200 from the trunk cable 10.

The front portion 204 of the cable attachment module 200 includes a hollowed out joint ball 240, the hollow being part of (and in communication with the rest of) the cavity 222. Thus (referring to FIG. 3B), the cable attachment module 200 includes a central body portion 203 flanked on one side by the joint ball 240, and on the opposing side by the plurality of crimp legs 230. The forward end of the joint ball 240 coincides with the open front end 226 of the cavity 222. A back end 242 of the joint ball 240 extends from a waist 244 of the shell 220.

The joint ball 240 is configured to pivotally mate with a socket of a splice housing module 300. The configuration of the waist 244 can, at least to an extent, determine the maximum amount of pivoting between the joint ball 240 and a socket 326 (FIG. 4A) of a splice housing module 300 in any one direction, the maximum pivot occurring when the rear end 324 (FIG. 4A) of the splice housing module 300 contacts the waist 244. Thus, the dimensions of the joint ball 240, the socket 326, and the waist 244 can be configured to preclude more than a maximum predefined bending of the optical fibers and splices housed by the assembly 100.

Figure 4A:
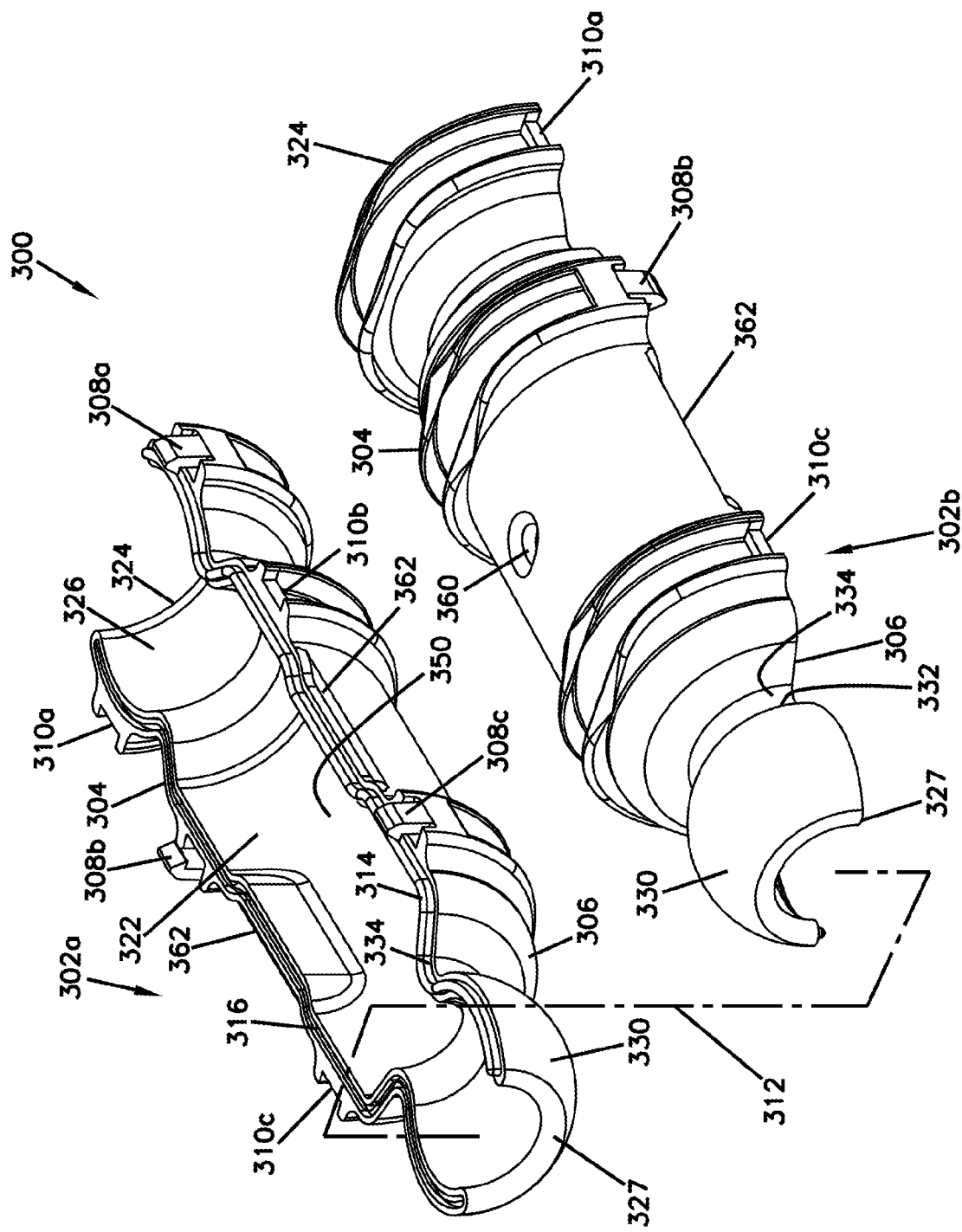
FIG. 4A is a perspective exploded view of an example splice housing module of the splice housing assembly of FIG. 1.
Figure 4B:
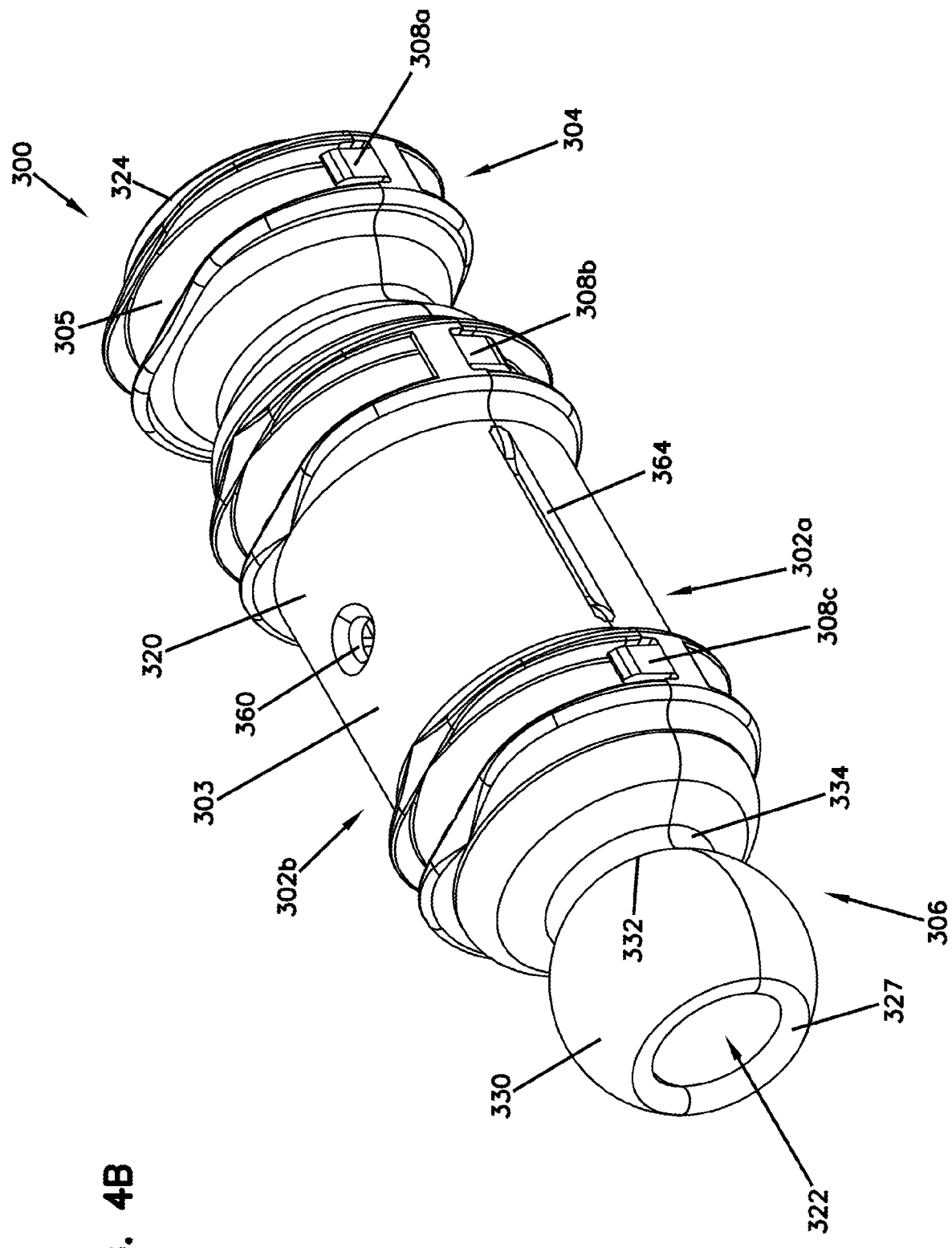
FIG. 4B is a perspective view of the splice housing module of FIG. 4A in an assembled configuration.

FIG. 4A is a perspective exploded view of an example splice housing module 300 of the splice housing assembly 100 of FIG. 1. FIG. 4B is a perspective view of the splice housing module of FIG. 4A in an assembled configuration.

Referring to FIGS. 4A and 4B (collectively, FIG. 4), in this example, the splice housing module 300 consists of two complementary pieces 302a and 302b. Though not required, in this example the two complementary pieces 302a and 302b are identical. Each of the pieces (302a, 302b) includes a rear portion 304 and a front portion 306. The rear portion 304 is configured for pivotal coupling to the front portion of the rearwardly adjacent cable attachment module 200 or splice housing module 300. The front portion 306 is configured for pivotal coupling to the rear portion of the forwardly adjacent splice housing module 300 or furcation module 400.

Each piece (302a, 302b) includes, on opposing sides, complementary pairs of fastening components 308a and 310a, 308b and 310b, and 308c and 310c. These pairs of fasteners are configured to fasten the two pieces (302a, 302b) together. Mating of the two pieces 306a and 306b is represented by the dashed line 312. In the example shown, the fastening components are a flexible latch (308a, 308b, 308c) that lockingly snaps over a complementary bar (310a, 310b, 310c) in the opposing piece. The latches (308a, 308b, 308c) of the piece 302a engage, respectively, the bars (310a, 310b, 310c) of the piece 302b, and vice versa.

In addition, in this example, each piece (302a, 302b) includes, on opposing sides, a ridge 314 and a complementary groove 316, the ridge 314 of one piece being configured to nest in the groove 316 of the other piece, and vice versa. In this example, the ridge 314 and the groove 316 generally follow a contour of the front portion 306 and the rear portion 304. The ridge and groove coupling can enhance a fastening between the two pieces 302a and 302b and also provide a seal between the two pieces. In some examples, the groove 316 can be filled with an epoxy or other sealant to firmly join the two pieces 302a and 302b.

When the two pieces 302a and 302b are joined together to form the splice housing module 300, the splice housing module 300 is a shell 320 defining an interior cavity 322. The cavity 322 has on open back end 324 and an open front end 327. Thus, optical fibers can enter the cavity 322 at the open back end 324, continue through, and in some cases be spliced within, the cavity 322 and exit at the open front end 327.

A part of the cavity 322 within the rear portion 304 of the splice housing module 300 is configured as a socket 326 to receive a joint ball of another module, such as the joint ball 240 of the cable attachment module 200 or a joint ball 330 of another splice housing module 300.

The front portion 306 of the splice housing module 300 includes a hollowed out joint ball 330, the hollow being part of the cavity 322. Thus (referring to FIG. 4B), the splice housing module 300 includes a central body portion 303 flanked on one side by the joint ball 330, and on the opposing side by a socket portion 305, and the cavity 322 is continuous between (i.e., in communication with) the joint ball 330, the central body portion 303, and the socket portion 305. The forward end of the joint ball 330 coincides with the open front end 327 of the cavity 322. A back end 332 of the joint ball 330 extends from a waist 334 of the shell 320.

The joint ball 330 is configured to pivotally mate with a socket 326 of another splice housing module 300, or with a socket of the furcation module 400. The configuration of the waist 334 can, at least to an extent, determine the maximum amount of pivoting between the joint ball 330 and a socket in any one direction, the maximum pivot occurring when the rear end of the socket contacts the waist 334. Thus, the dimensions of the joint ball 330, the socket 326, and the waist 334 can be configured to preclude more than a maximum predefined bending of the optical fibers and splices housed by the assembly 100.

A central portion 350 of the cavity 322 can house one or more optical fiber splices. In some examples, the splices are held by a splice holder, which will be described in greater detail below. The central portion 350 of the cavity 322 is configured to house a holder for multiple optical fiber splices and additional optical fibers passing through the splice holder, as will be described in greater detail below.

In the example splice housing module 300 shown, each of the pieces (306a, 306b) has an injection port 360 that passes through the shell 320. Once the splice housing assembly 100 has been assembled, optionally a gel or other filling material can be injected into the cavities 322 of one or more of the splice housing modules 300 via one or both of the injection ports 360. Doing so can help to protect and seal off from contaminants the optical fibers and splices contained within the splice housing modules 300.

Figure 19:
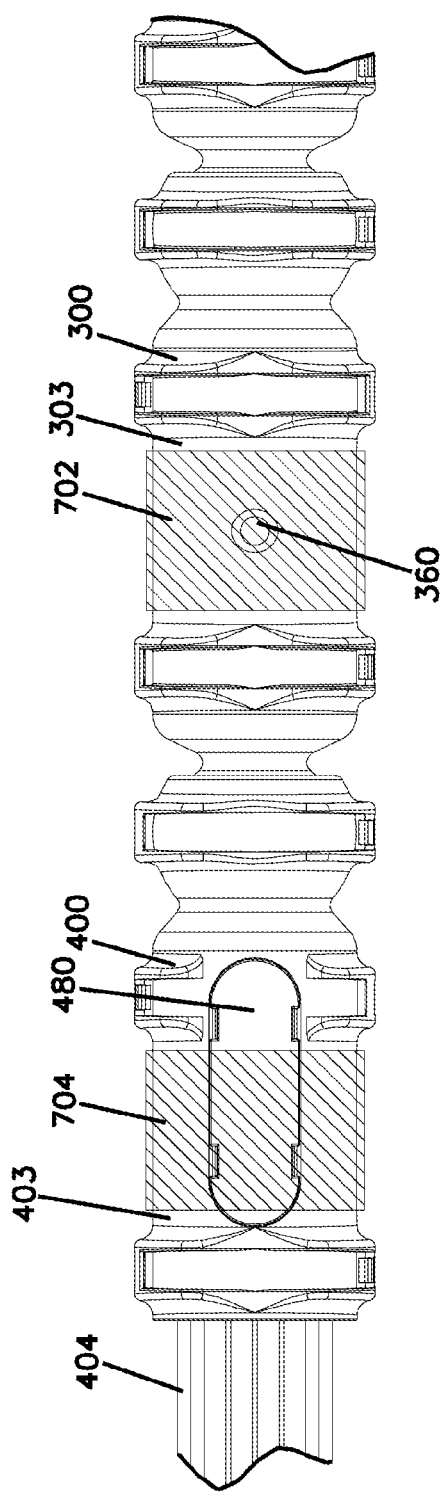
FIG. 19 is a view of a portion of the splice housing assembly of FIG. 1, including anti-tampering components.

In some examples, the central body portion 303 of each splice holding module is defined by a relatively smooth cylindrical or substantially cylindrical outer surface that can accommodate a protective element, such as a ring shaped anti-tamper sleeve 702 (FIG. 19) for covering over and/or protecting the injection port 360. The anti-tamper sleeve 702 can also function to indicate whether an attempt has been made to separate the two complementary pieces 302a and 302b of a splice housing module 300.

In the example splice housing module 300 shown, each of the pieces (302a, 302b) includes a pair of notches 362 in opposing sides of the shell 320 between the rear portion 304 and the front portion 306. When the splice housing module 300 is assembled and the two pieces 302a and 302b are fastened together, the notches 362 of one piece 302a align with the notches 362 of the other piece 302b forming a notch 364 on either side of an exterior of the shell 320 of the splice housing module 300. The notch 364 can provide a fulcrum for more easily disassembling a splice housing module 300 after it has been assembled, e.g., by inserting a tool, such as a screwdriver head, into the notch 364 to pry off one of the pieces (302a, 302b) from the other piece.

Figure 5A:
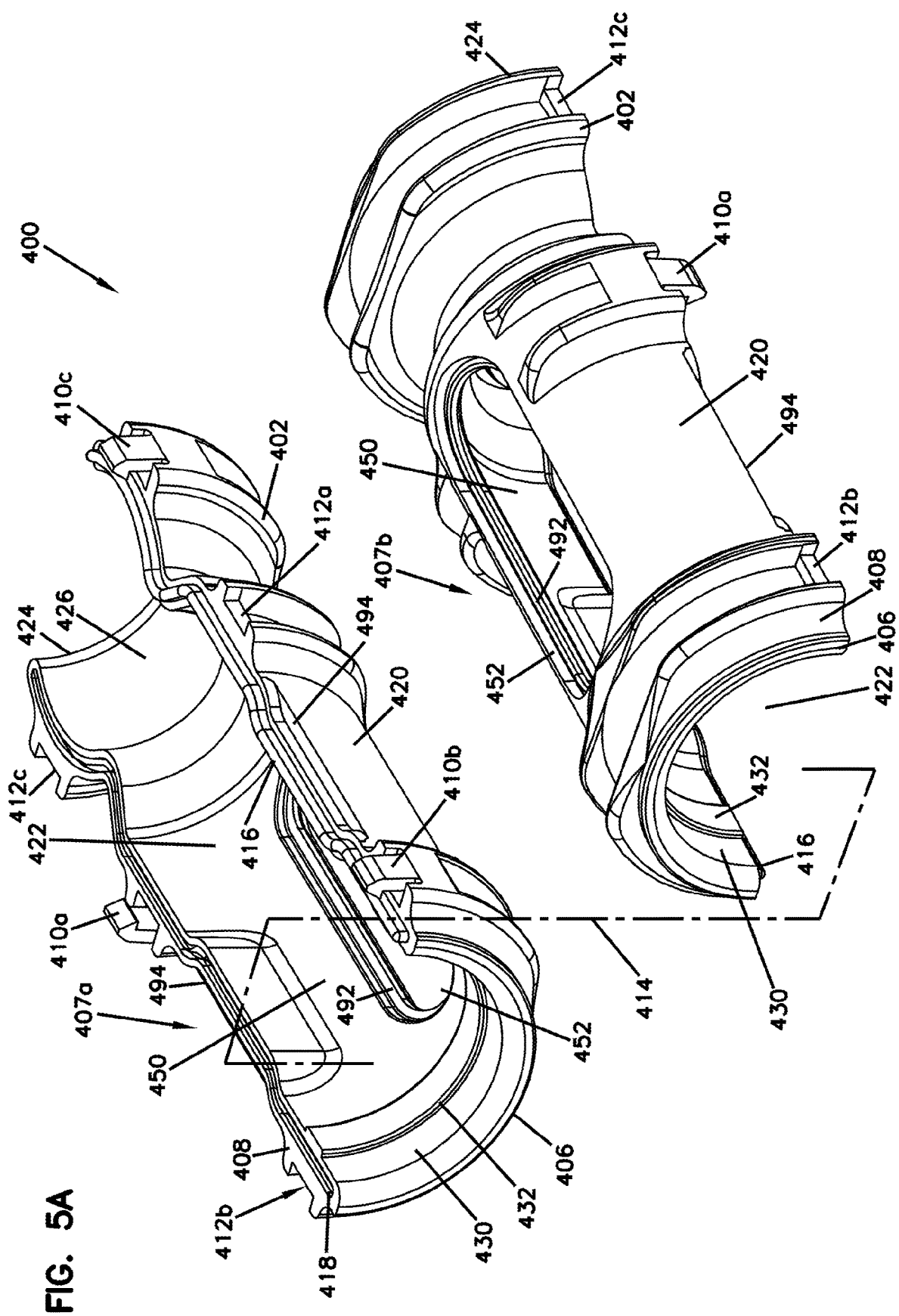
FIG. 5A is a perspective exploded view of an example furcation module of the splice housing assembly of FIG. 1.
Figure 5B:
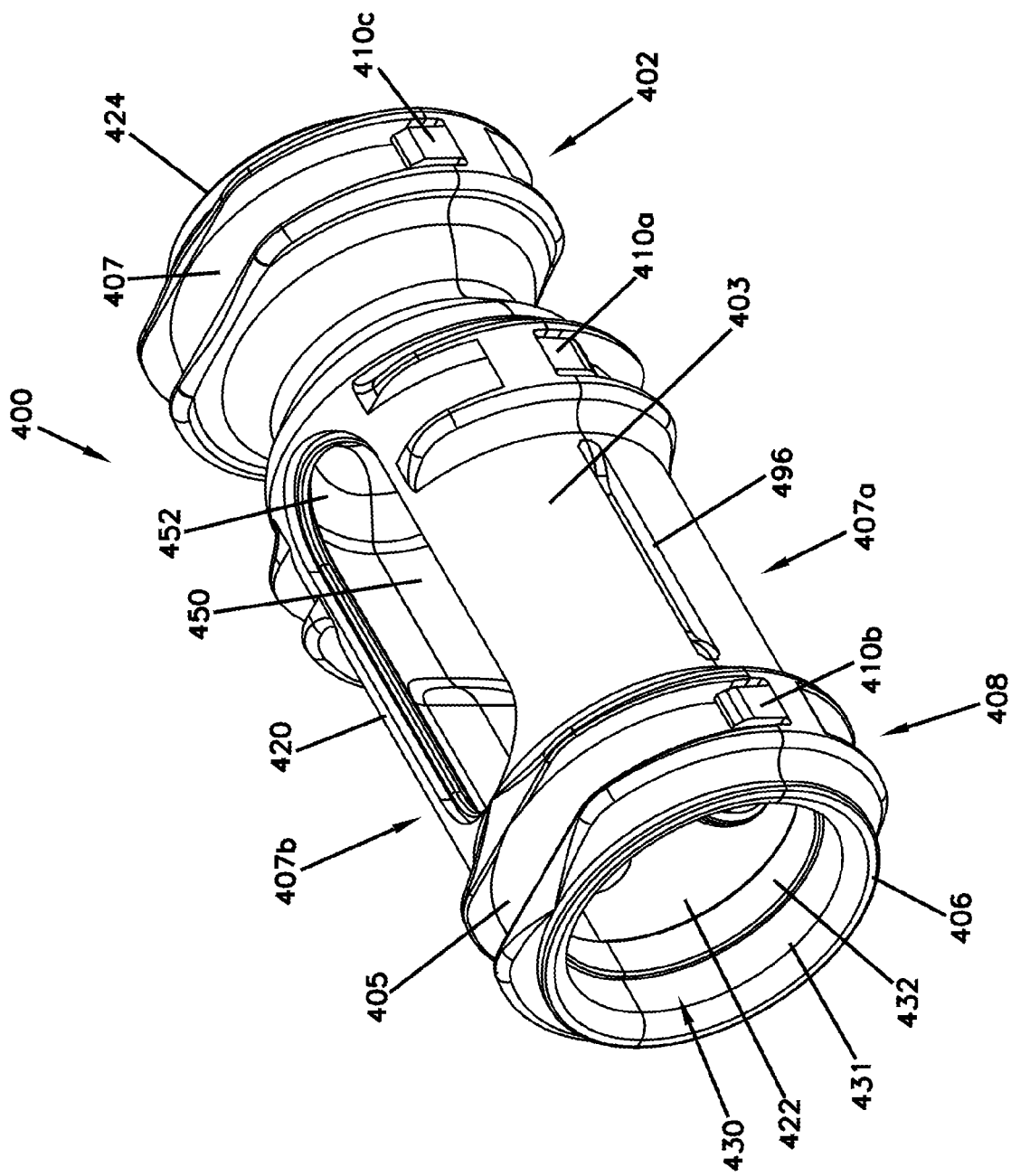
FIG. 5B is a perspective view of the furcation module of FIG. 5A in an assembled configuration.
Figure 5C:
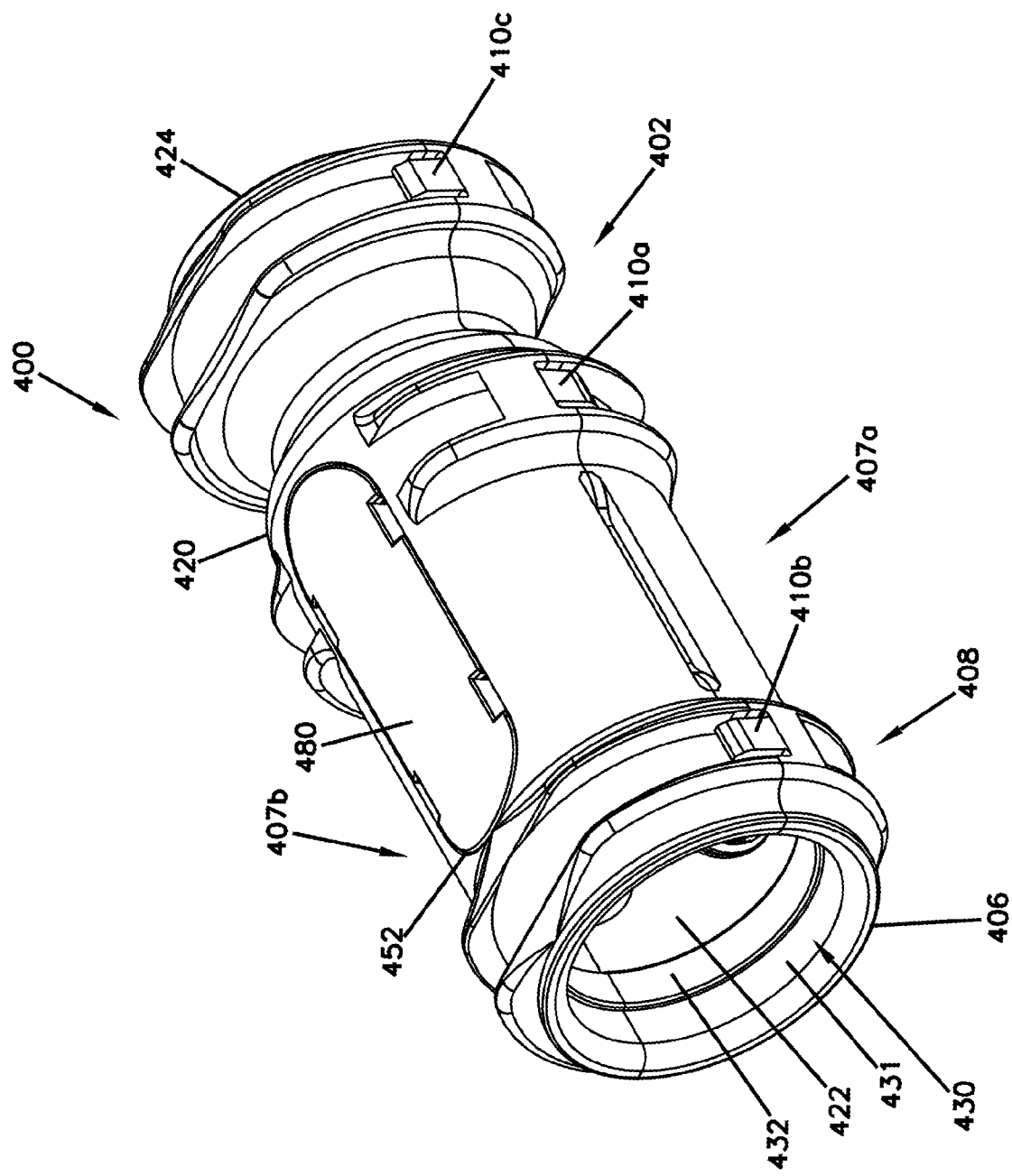
FIG. 5C is a perspective view of the furcation module of FIG. 5A in an assembled and covered configuration.

FIG. 5A is a perspective exploded view of an example furcation module 400 of the splice housing assembly 100 of FIG. 1. FIG. 5B is a perspective view of the furcation module 400 of FIG. 5A in an assembled configuration. FIG. 5C is a perspective view of the furcation module 400 of FIG. 5A in an assembled and covered configuration.

Referring to FIGS. 5A-5C (collectively, FIG. 5), in this example, the furcation module 400 consists of two complementary pieces 407a and 407b. Though not required, in this example the two complementary pieces 407a and 407b are identical. Each of the pieces (407a, 407b) includes a rear portion 402 and a front portion 408. The rear portion 402 is configured for pivotal coupling to the joint ball 330 of the rearwardly adjacent splice housing module 300. The front portion 408 is configured to house a furcation cap, as described below.

Each piece (407a, 407b) includes, on opposing sides, complementary pairs of fastening components 410a and 412a, 410b and 412b, and 410c and 412c. These pairs of fasteners are configured to fasten the two pieces (407a, 407b) together. Mating of the two pieces 407a and 407b is represented by the dashed line 414. In the example shown, the fastening components are a flexible latch (410a, 410b, 410c) that lockingly snaps over a complementary bar (412a, 412b, 412c) in the opposing piece. The latches (410a, 410b, 410c) of the piece 407a engage, respectively, the bars (412a, 412b, 412c) of the piece 407b, and vice versa.

In addition, in this example, each piece (407a, 407b) includes, on opposing sides, a ridge 416 and a complementary groove 418, the ridge 416 of one piece being configured to nest in the groove 418 of the other piece, and vice versa. In this example, the ridge 416 and the groove 418 generally follow a contour of the front portion 408 and the rear portion 402. The ridge and groove coupling can enhance a fastening between the two pieces 407a and 407b and also provide a seal between the two pieces. In some examples, the groove 418 can be filled with an epoxy or other sealant to firmly join the two pieces 407a and 407b.

When the two pieces 407a and 407b are joined together to form the furcation module 400, the furcation module 400 is a shell 420 defining an interior cavity 422. The cavity 422 has an open back end 424 and an open front end 406. Thus, optical fibers can enter the cavity 422 at the open back end 424, continue through the cavity 422 and exit at the open front end 406.

A part of the cavity 422 within the rear portion 402 of the furcation module 400 is configured as a socket 426 to receive a joint ball of another module, such as the joint ball 330 of a splice housing module 300.

The front portion 408 of the furcation module 400 includes a furcation cap holding area 430. Thus (referring to FIG. 5B), the furcation module 400 includes a central body portion 403 flanked on one side by the furcation cap portion 405, and on the opposing side by a socket portion 407, and the cavity 422 is continuous between (i.e., in communication with) the furcation cap portion 405, the central body portion 403, and the socket portion 407. When assembled, a furcation cap (as described below) can straddle an annular rib 432 projecting inwardly from the inner surface 431 of the shell 420 to securely hold the furcation cap within the furcation cap holding area 430.

A central portion 450 of the cavity 422 (within the central body portion 403) provides a fiber routing volume, in which individual spliced fibers or groups of spliced fibers—the fibers being spliced in splice housing modules 300 rearwards of the furcation module—can be routed via designated furcation tubes, the furcation tubes being held by the furcation cap and extending from the front end 406. In some examples, ribbonized fibers can be de-ribbonized in the cavity 422 in order to achieve the desired fiber routing.

A coverable port 452 in each of the pieces (407a, 407b) permits access to the central portion 450 of the cavity 422 to perform, view, and verify the necessary furcation, deribbonization, and/or routing of fibers and groups of fibers. In an assembled furcation module 400, there can be, therefore, two coverable ports 452. The port 452 provides convenient and closable access to the central portion 450 of the cavity 422 to, e.g., ensure that fibers are properly routed to furcation tubes and/or to fill the fan-out portion with a sealant (e.g., an epoxy) for sealing the fibers therein. Once the furcated and routed fibers have been sealed, covers 480 (described in detail below and also shown in FIG. 5C), can be secured to the ports 452 to close off access to the cavity 422.

In the example furcation module 400 shown, each of the pieces (407a, 407b) includes a pair of notches 494 in opposing sides of the shell 420 between the rear portion 402 and the front portion 408. When the furcation module 400 is assembled and the two pieces 407a and 407b are fastened together, the notches 494 of one piece 407a align with the notches 494 of the other piece 407b forming a notch 496 on either side of an exterior of the shell 420 of the furcation module 400. The notch 496 can provide a fulcrum for more easily disassembling the furcation module 400 after it has been assembled, e.g., by inserting a tool, such as a screwdriver head, into the notch 496 to pry off one of the pieces (407a, 407b) from the other piece.

Figure 6:
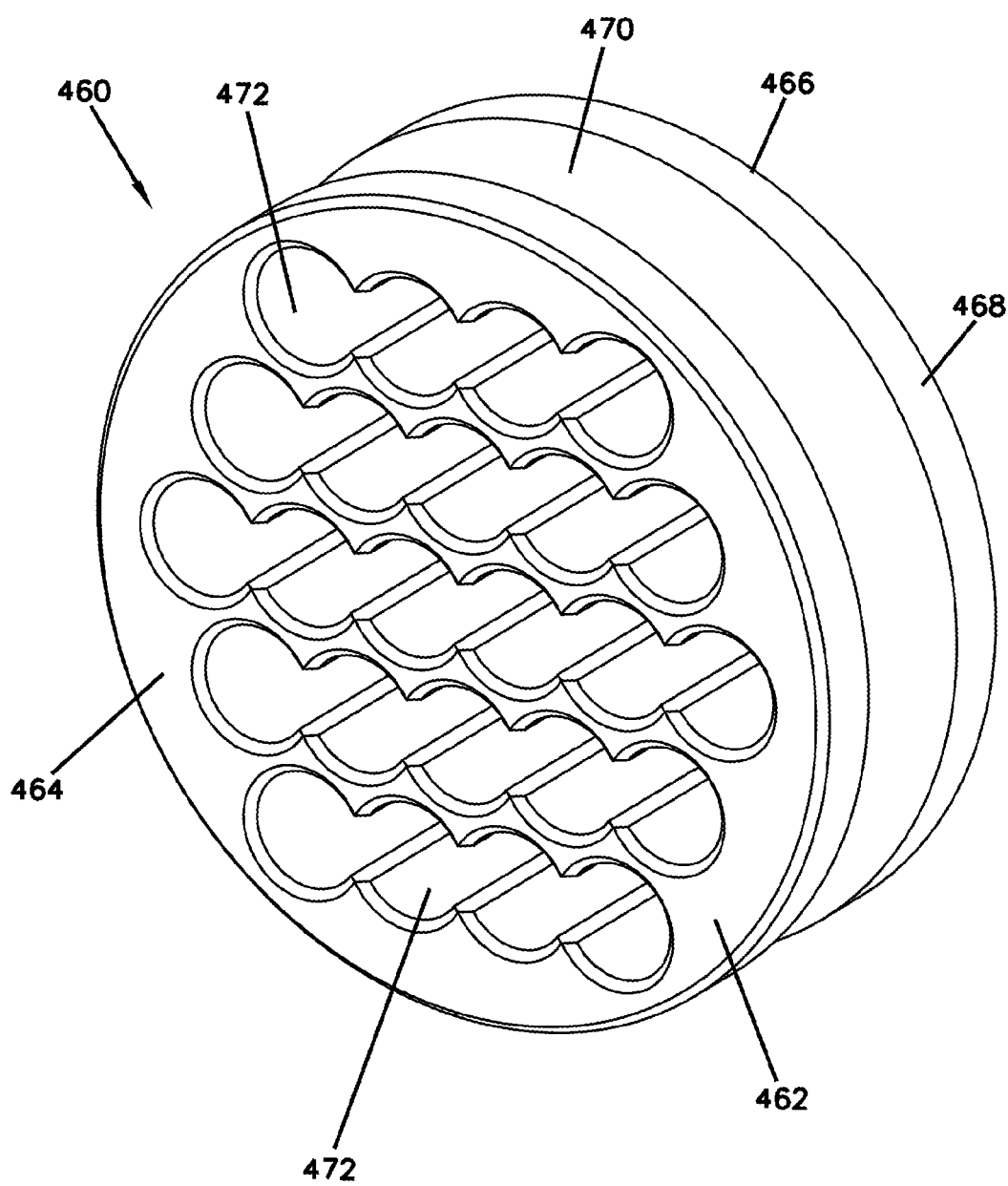
FIG. 6 is a perspective view of an example furcation cap that can be housed in the furcation module of FIGS. 5A-5C.

FIG. 6 is a perspective view of an example furcation cap 460 that can be housed in the furcation module 400 of FIG. 5. The furcation cap 460 is configured to receive a plurality of furcation tubes, such as the furcation tubes 404 shown in FIG. 1. Each of the furcation tubes 404 can carry and thereby route to a desired end location or device one or more fibers that have been spliced in one of the splice housing modules 300. The routed fibers can be loose or ribbonized.

Referring to FIG. 6, the furcation cap 460 includes a main body 462 having a front face 464 and an opposing back face 466. A side 468 longitudinally extends between the front face 464 and the back face 466. In this example, the furcation cap 460 is symmetrical about a plane perpendicular to the longitudinal axis that bisects the furcation cap 460 between the front face 464 and the back face 466.

The side 468 includes an annular groove 470 configured to mate (e.g., via a frictional fit) with the annular rib 432 (FIG. 5) of the furcation module 400 to thereby secure the furcation cap 460 within the furcation cap holding area 430 of the furcation module 400.

A plurality of substantially tubular channels 472 extend between the front face 464 and the back face 466. Each of the channels 472 is configured to receive a furcation tube 404 (FIG. 1). In the example shown, twenty-four channels 472 are depicted, such that the furcation cap can accommodate twenty-four furcation tubes. However, the furcation cap can alternatively include more or fewer channels for receiving furcation tubes.

Figure 7:
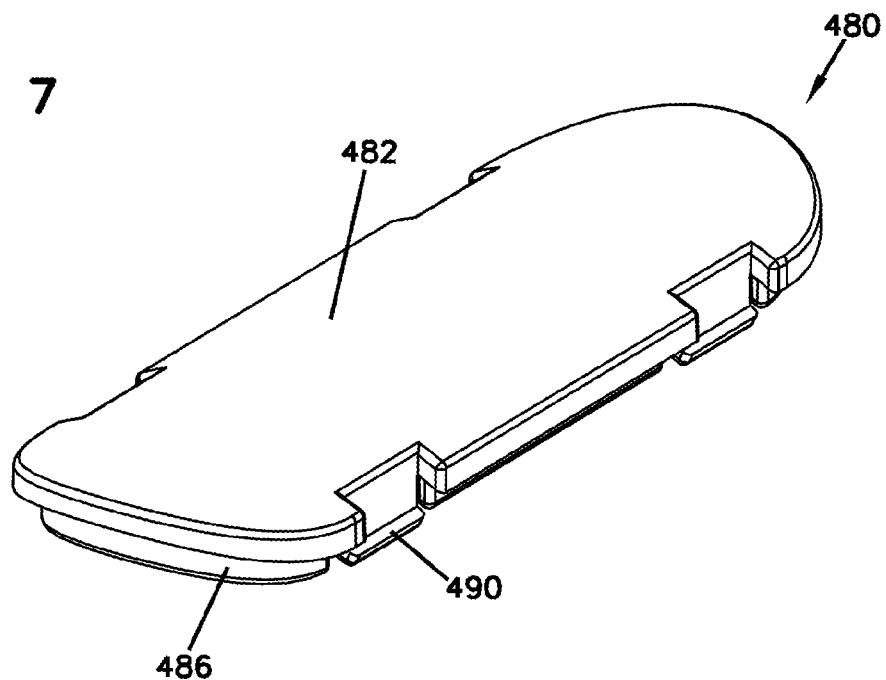
FIG. 7 is a perspective view of an example cover of the furcation module of FIGS. 5A-5C.
Figure 8:
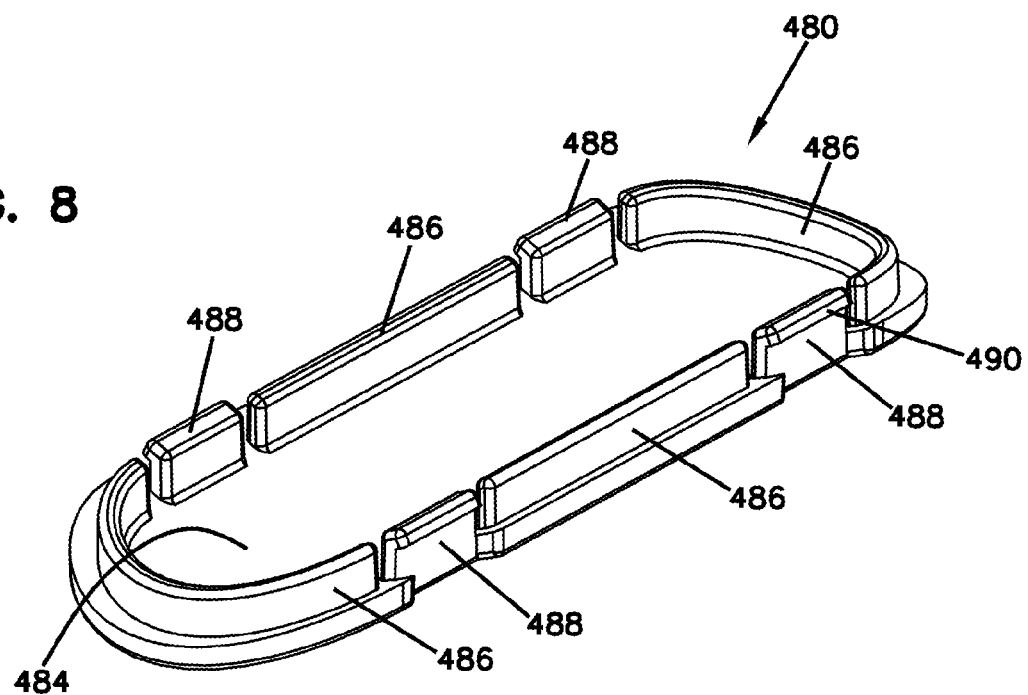
FIG. 8 is a further perspective view of the cover of FIG. 7.

FIG. 7 is a perspective view of an example cover 480 of the furcation module 400 of FIG. 5. FIG. 8 is a further perspective view of the cover 480 of FIG. 7.

Referring to FIGS. 7-8, the cover 480 includes a contoured outer surface 482, and a contoured inner surface 484, the outer surface 482 being convex and the inner surface 484 being concave. Extending inward from the inner surface 484 are a plurality of projections 486 and a plurality of fasteners 488. The projections 486 can help to align the cover 480 within the port 452 of the furcation module 400 (FIG. 5).

In this example, the fasteners 488 are latches. The latches 488 are flexibly resilient and have hooked portions 490 configured to snappingly engage the lip 492 (FIG. 5) within the port 452 to thereby secure the cover 480 within the port 452.

One or both of the covers 480 can be installed on the ports 452 after the furcation and routing of fibers within the furcation module 400 has been completed and a sealant has been injected into the furcation module via one or both of the ports 452. In some examples, the cover 480 is configured to be removed from the furcation module 400 after it has been installed, e.g., by inserting a prying tool between the edge of the cover 480 and the port 452 and prying off the cover 480.

In some examples, the central body portion 403 is defined by a relatively smooth cylindrical or substantially cylindrical outer surface that can accommodate a protective element, such as a ring-shaped anti-tamper sleeve 704 (FIG. 19) for covering over, protecting, and/or further securing the covers 480. The anti-tamper sleeve 704 can also function to indicate whether an attempt has been made to separate the two complementary pieces 402a and 402b of a furcation module. A similar anti-tamper device can be used for the cable attachment module 200.

Figure 9:
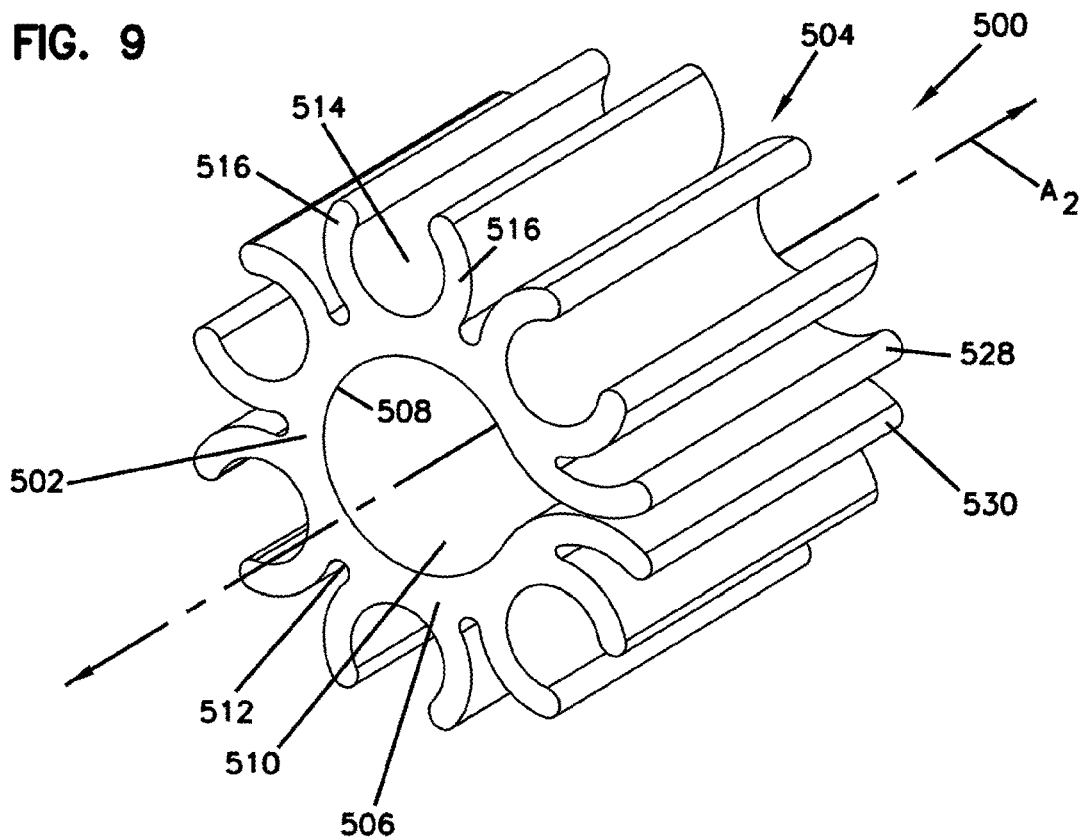
FIG. 9 is a perspective view of an example splice holder in accordance with the present disclosure.
Figure 10:
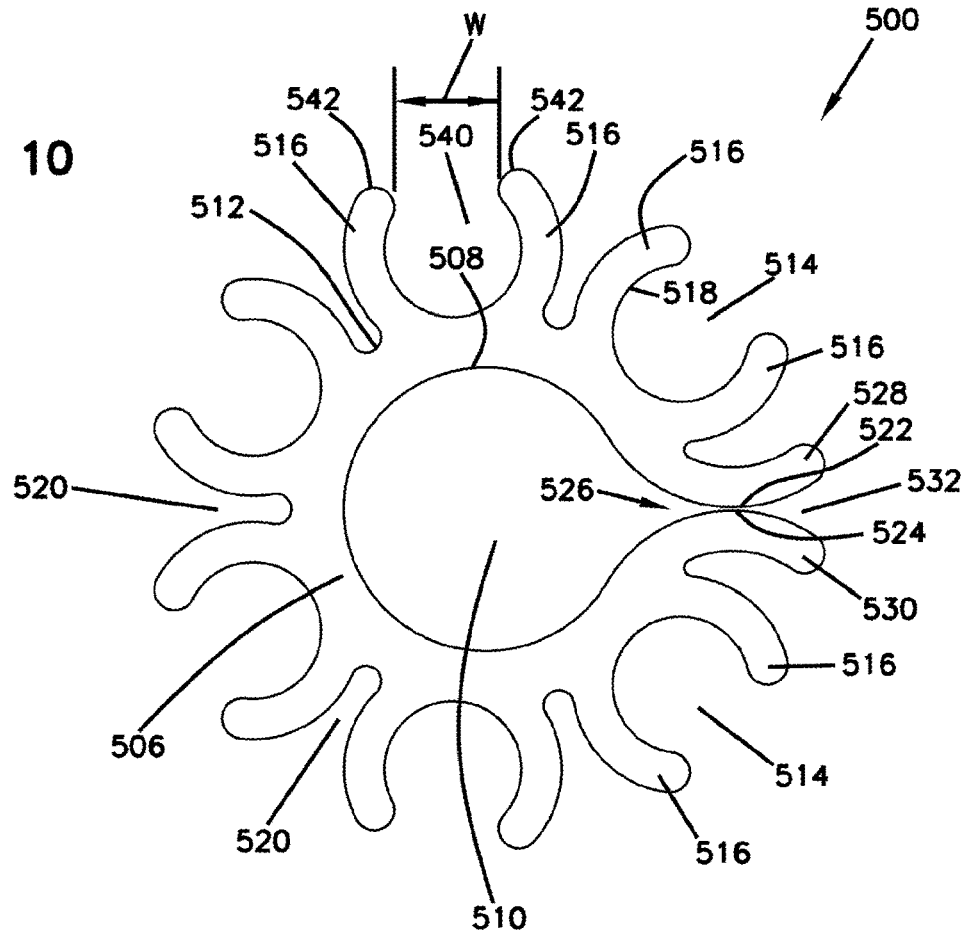
FIG. 10 is an end view of the splice holder of FIG. 9.
Figure 11:
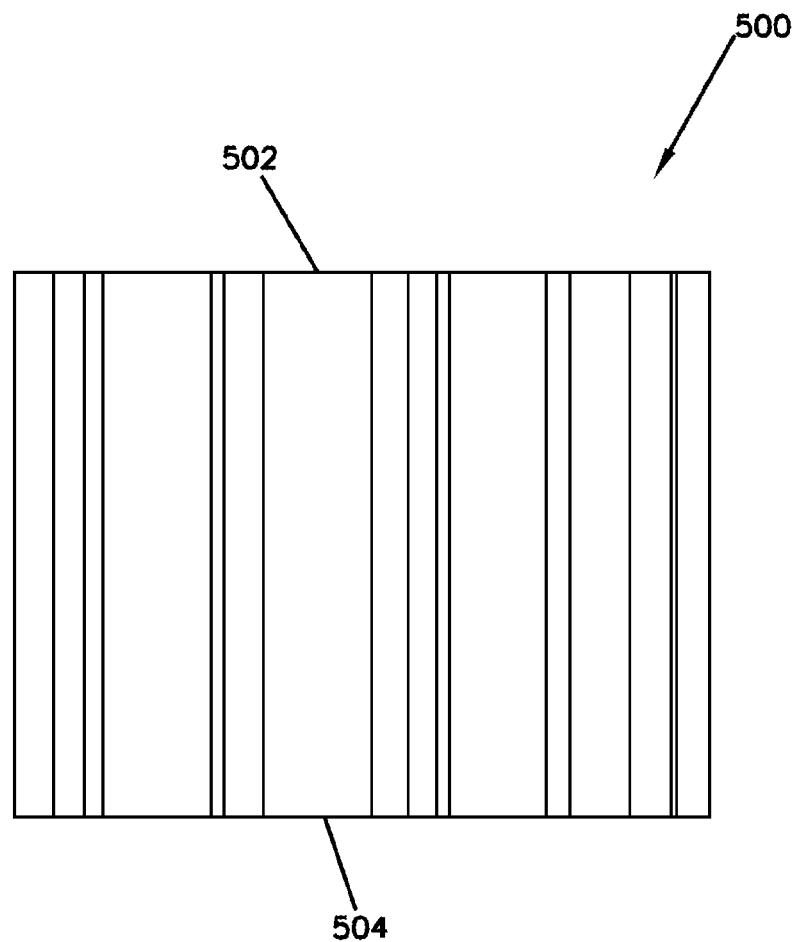
FIG. 11 is a side view of the splice holder of FIG. 9.

FIG. 9 is a perspective view of an example splice holder 500 in accordance with the present disclosure. FIG. 10 is an end view of the splice holder 500 of FIG. 9. FIG. 11 is a side view of the splice holder 500 of FIG. 9.

Referring to FIGS. 9-11, the splice holder 500 has a central longitudinal axis $A_2$. The axis $A_2$ generally coincides with the axis $A_1$ of the assembly 100 (FIG. 1) when the splice holder 500 is installed in the assembly 100, though as described below, in some examples translational movement of the splice holder 500 within a splice housing module 300 can occur, which may result in non-coincidence/non-alignment of the axis $A_1$ and the axis $A_2$. The assembly 100 can have a plurality of splice holders 500. For example, each of the splice housing modules 300 can house one more splice holders 500. Perpendicular to the longitudinal axis $A_2$, the splice holder 500 has a front face 502 and an opposing back face 504. In this example, the splice holder 500 is symmetrical about a plane that is perpendicular to axis $A_2$ and bisects the splice holder 500 between the front face 502 and the back face 504.

The splice holder includes a wall 506. The wall 506 has an inner surface 508 that defines a longitudinal bore 510. The wall 506 also has an outer surface 512 that supports a plurality of longitudinally oriented channels 514 disposed circumferentially around the wall 506 at a plurality of circumferential positions. In this example, the channels 514 are formed integrally with the wall 506 and each of the channels 514 is adapted to hold an optical fiber splice. Any suitable number of channels can be provided on the wall 506 corresponding to the number of splices (e.g., any number between one and twenty-four, or more). A gap 520 between adjacent channels 514 can be increased or decreased to accommodate more or fewer channels. In the example splice holder 500 shown, six channels are provided, such that the splice holder 500 can accommodate six splices at six circumferentially different positions.

In the example shown, each of the channels 514 is defined by a pair of flexibly resilient, spaced apart arms 516 extending from the outer surface 512 of the wall 506. The arms 516 of each pair have opposite curvatures, such that the channel 514 between the arms 516 has a substantially round profile 518 for receiving a substantially cylindrical splice protector, such as a splice sleeve. For each pair of arms 516, the space 540 between the respective ends 542 of the arms 516 provides access for placing a splice protector in the corresponding channel 514. In some examples, the width of the space 540 when the arms 516 are in a relaxed position is somewhat smaller than the maximum width of the splice protector. In these examples, the flexible resilience of the arms 516 permit the arms to be separated more when inserting the splice protector. Once the protector clears the space 540, the arms 516 return to their relaxed positions, thereby securing the splice protector within the channel 514.

In some examples, the wall 506 is flexibly resilient and has a first end 522 and a second end 524 forming an openable and closable junction 526, the junction 526 being closed when the first end 522 and the second end 524 abut each other, and the junction 526 being open when the first end and the second end are moved apart from each other forming a slot for accessing the interior bore 510. In the example shown, outward from the junction 526, the wall 506 extends from the first end 522 and the second end 524 in extensions 528 and 530 that diverge from each other forming an approximately V-shaped entry 532. The shape of the entry 532 can act as levers to assist in separating the extensions 528 and 530 when inserting fibers into the bore 510.

Typically, for a given splice housing module 300, all of the optical fibers passing through the module 300 that are spliced within that module will be routed through the channels 514, while all of the fibers that are not spliced within that module will be inserted into the bore 510 by moving part the extensions 528 and 530 to form an access slit to the bore 510. Due to the resilient nature of the wall 506, once the fibers have been inserted in the bore 510, in some examples the junction 526 returns to its closed configuration or a nearly closed configuration.

Figure 12:
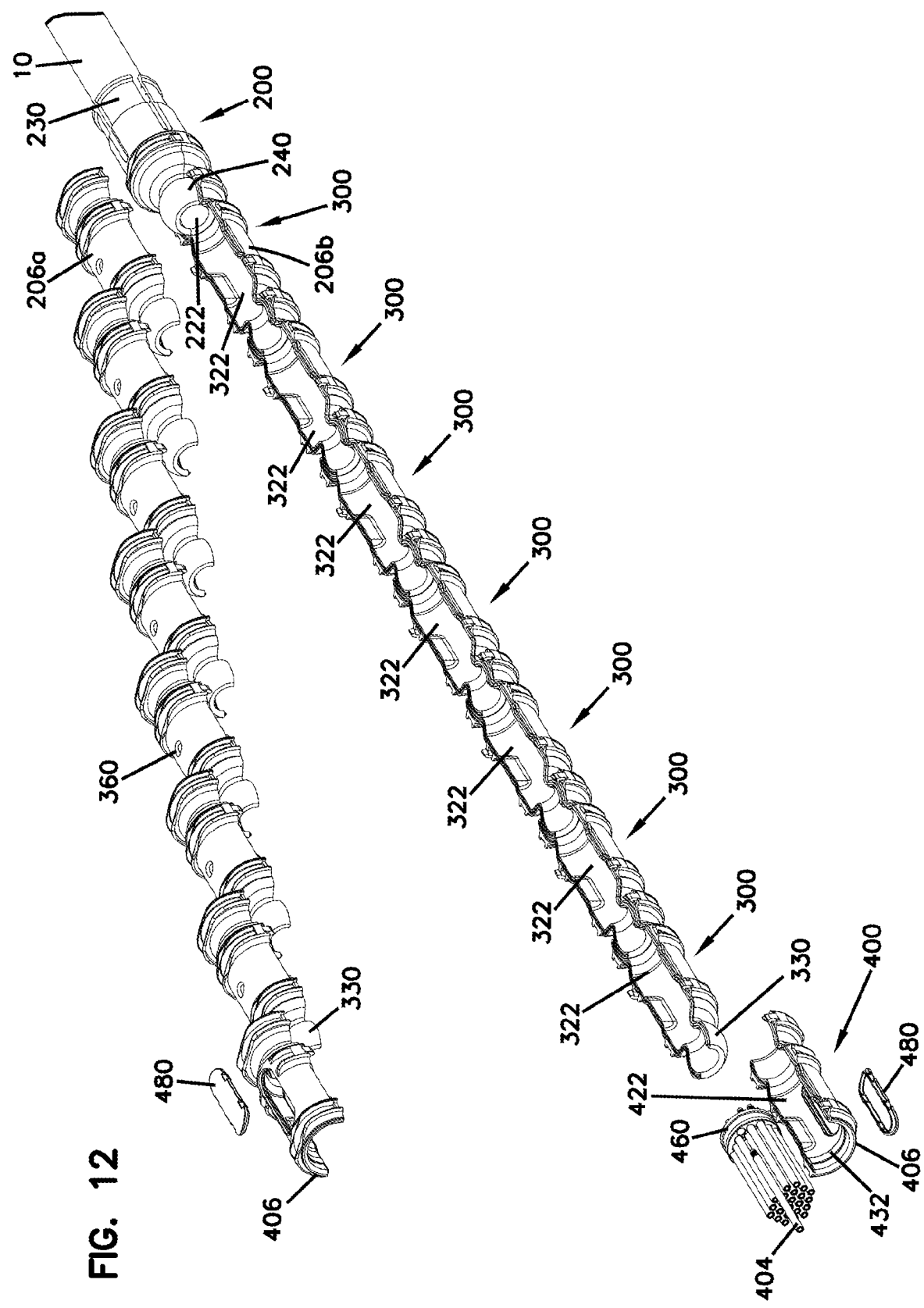
FIG. 12 is an exploded view of the splice housing assembly of FIG. 1 without optical fibers.
Figure 13:
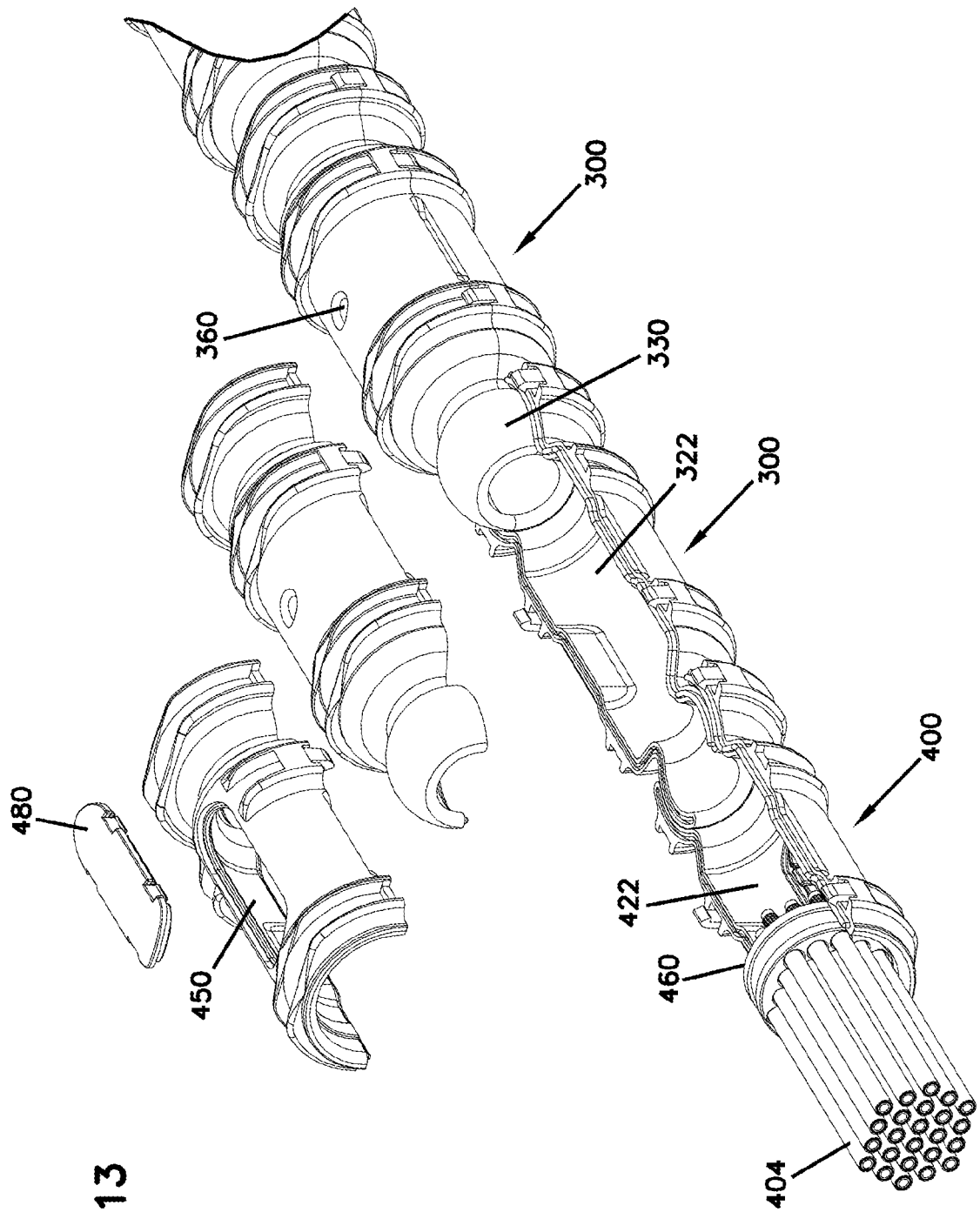
FIG. 13 is an exploded view of a portion of the splice housing assembly of FIG. 1 without optical fibers.

FIG. 12 is an exploded view of the splice housing assembly 100 of FIG. 1 without optical fibers passing through the assembly. FIG. 13 is an exploded view of a portion of the splice housing assembly 100 of FIG. 1 without optical fibers passing through the assembly.

Referring to FIGS. 12-13, the assembly 100 includes the cable attachment module 200, the series of splice housing modules 300, and the furcation module 400, as described above. Referring to FIG. 12, a nesting between the joint ball 240 of the cable attachment module and half of the socket of the adjacent splice housing module 300 is depicted. Referring to FIG. 13, a nesting between the joint ball 330 of one of the splice housing modules 300 and half of the socket of the forwardly adjacent splice housing module 300 is depicted. As shown in FIGS. 12-13, a continuous channel through the entire longitudinal length of the assembly 100 is formed by the inter-communication of the cavity 222, the series of cavities 322, and the cavity 422.

Figure 14:
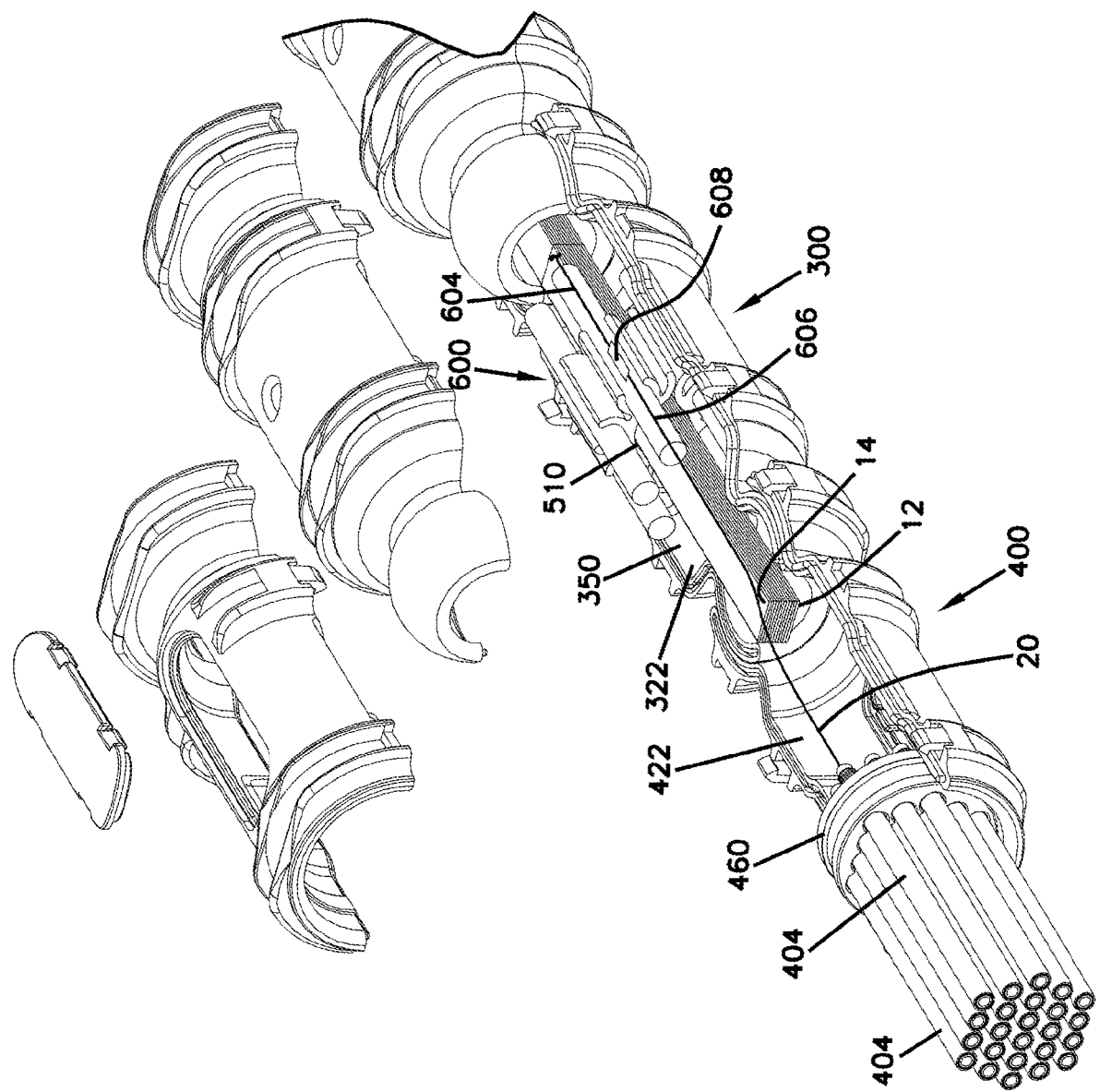
FIG. 14 is an exploded view of a portion of the splice housing assembly of FIG. 1 and a furcation module of FIG. 1, including an example splice holding assembly in accordance with the present disclosure.
Figure 15:
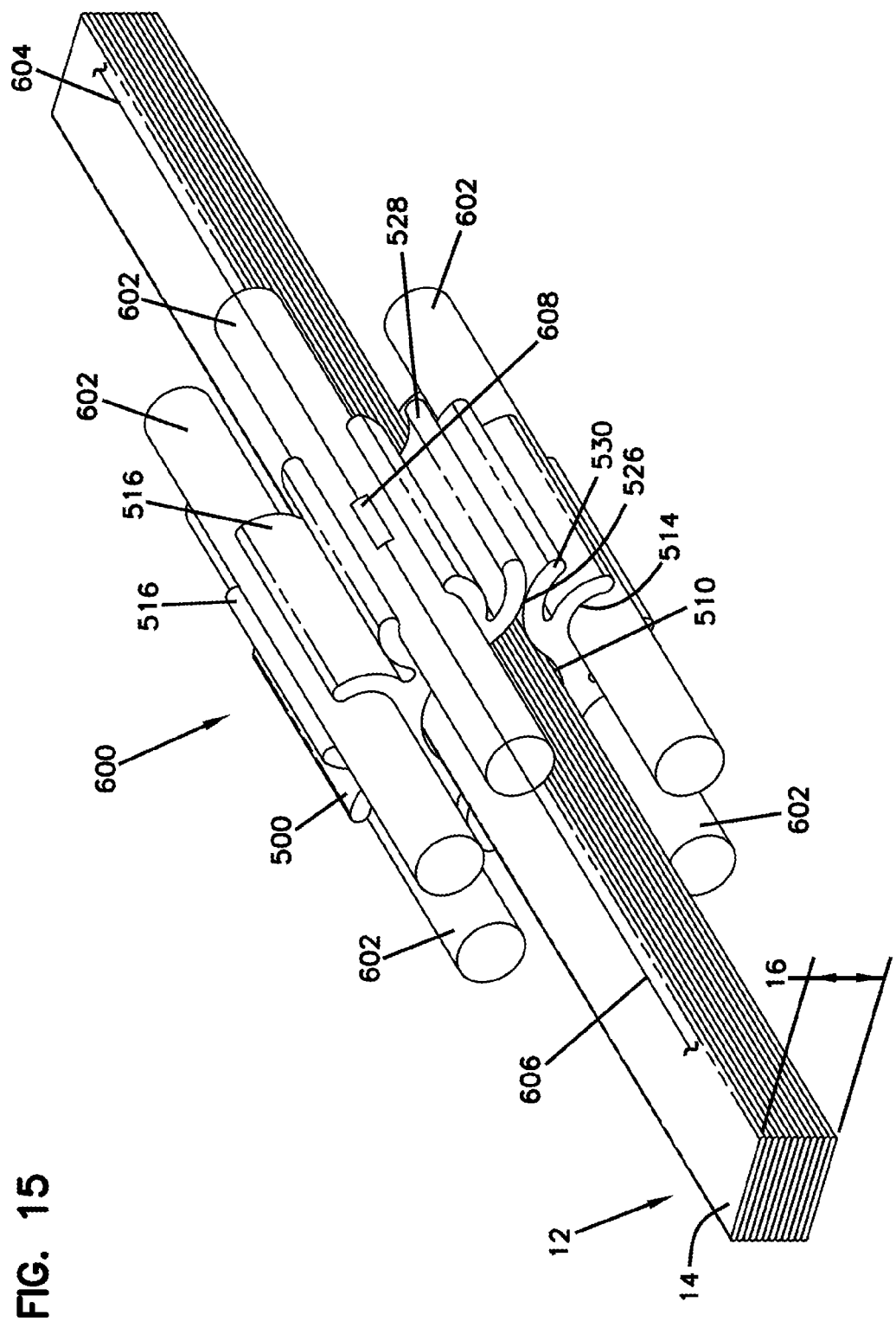
FIG. 15 is a perspective view of the splice holding assembly of FIG. 14, including a plurality of fibers passing through the splice holding assembly.

FIG. 14 is an exploded view of a portion of a splice housing module 300 and a furcation module 400 of FIG. 1 including an example splice holding assembly 600 in accordance with the present disclosure. FIG. 15 is a perspective view of the splice holding assembly 600 of FIG. 14, including a plurality of fibers passing through the splice holding assembly 600. FIG. 16 is a view of a portion of part of a splice housing module 300 of FIG. 14. FIG. 17 is a cross-sectional view of the splice housing module 300 of FIG. 16, taken along the line 17-17 in FIG. 16.

Referring to FIGS. 14-17, a plurality of optical fibers 12 are depicted. The optical fibers 12 are spliced or non-spliced continuations of the optical fibers carried by the trunk cable 10 (FIG. 1). In this example, the optical fibers 12 are a stack 16 of fiber ribbons 14. Upon entry of the fiber ribbons 14 into the cavity 422, the fiber ribbons can be de-ribbonized and the resulting fibers routed to the various furcation tubes 404 as described above. An example of such a resulting fiber 20 is shown schematically in FIG. 14. The fiber 20 has been separated from one of the ribbons 14 and routed to a furcation tube 404.

Within the complete splice housing module 300 shown in FIG. 14, the stack 16 of fiber ribbons 14 (in the example shown there are twelve fiber ribbons 14 in the stack 16) passes through the longitudinal bore 510 of the splice holder 500. The stack 16 of the fiber ribbons 14 can be inserted into the bore 510 by separating the extensions 528 and 530 and inserting the fiber ribbons 14 through the ensuing access slit between the extensions.

The splice holding assembly 600 is housed in the central portion 350 of the cavity 322 of the splice housing module 300. Each splice housing module 300 of the assembly 100 (FIG. 1) can similarly house a splice holding assembly 600.

The splice holding assembly 600 consists of the splice holder 500 described above (with the fibers 12 passing therethrough) and a plurality of splice protectors 602. The splice protector 602, shown in the figures as a splice sleeve, is configured to surround and protect one or more fiber splices contained within the protector 602. For example, a splice protector 602 could protect a multi-fiber splice, e.g., between a plurality of loose or ribbonized fibers, or a single fiber splice. In FIGS. 14-15, a fiber stub (or pigtail) 606 is shown schematically spliced to a fiber 604 at the splice 608 located within a splice protector 602. The fiber 604 has been de-ribbonized from among the ribbonized fibers carried by the trunk cable 10. Though not shown, the fiber stub 606 can continue forwards into one or more additional splice housing modules 300, and ultimately into a furcation module 400. In FIG. 14, the forward continuation of the fiber stub 606 is shown as the de-ribbonized fiber 20 that is routed to a furcation tube 404. Though a single fiber 604 and single fiber stub 606 are depicted, they could alternatively represent a plurality of fibers such as a ribbon or a group of loose fibers.

In this example, the splice holding assembly 600 includes six splice protectors 602 at six different circumferential positions, each of the splice protectors 602 being held in one of the channels 514 between adjacent arms 516 that define that channel, the six splice protectors and corresponding splices 608 surrounding the remaining fibers 12 in a circumferentially efficient manner. Thus, it should be appreciated that by providing a series of interconnected splice housing modules 300 as in the assembly 100 of FIG. 1, different subsets of fibers from the trunk cable 10 can be spliced in the splice holding assemblies 600 in different splice housing modules 300. Longitudinally staggering the splicing of the fibers from a trunk cable in this manner can help to limit the cumulative bulk or girth of the fibers in a given longitudinal splice location, as each splice is typically significantly thicker than the fiber itself.

Referring to FIG. 17, an approximately annular space 390 surrounds the splice holding assembly 600 within the cavity 322 of the splice holding module 300. This space 390 can be filled with a gel or other filling substance via the port 360 (FIG. 16) in the manner described above. Thus, in some examples, the splice holding assembly 600 "floats" within the cavity 322 of the splice housing module 300, submerged in a gel-like substance or, alternatively, air or another gas. Since the modules (200, 300, 400) of the assembly 100 can be pivoted relative to each other, the clearance provided by the space 390 allows for the splice holding assembly 600 to move translationally and/or rotationally within the splice holding module 300, which can help to prevent fiber pinching or other undesirable interferences with the fibers' continuity through the splice holding module 300.

Figure 18:
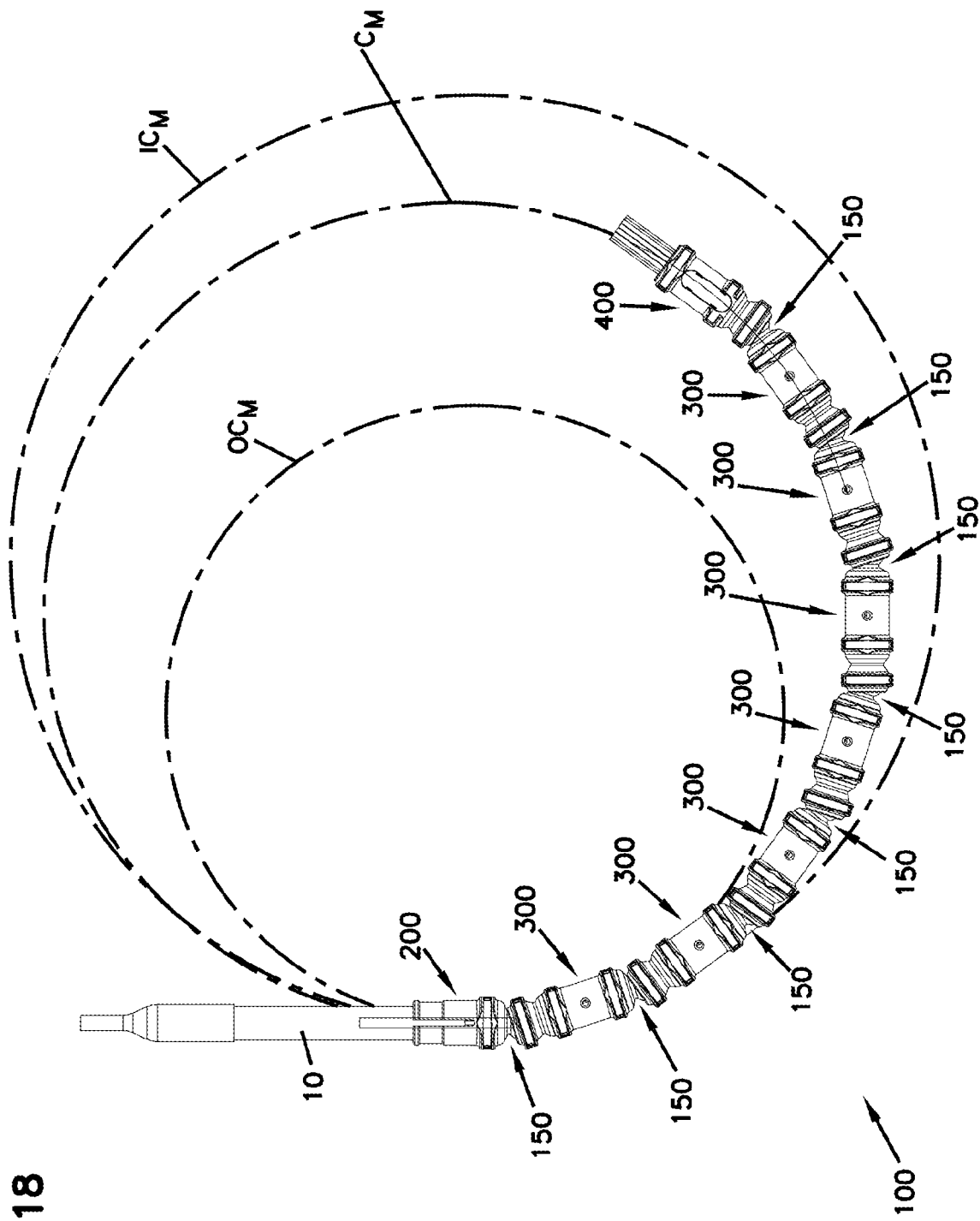
FIG. 18 is a further view of the splice housing assembly of FIG. 1 in the curved configuration of FIG. 2.

FIG. 18 is a further view of the splice housing assembly 100 of FIG. 1 in the curved configuration of FIG. 2. Between each pair of adjacent modules (200, 300, 400) is a pivoting joint 150 formed by a ball and socket in the manner described above. Each of the joints 150 has a maximum pivot in any one direction. All of the joints 150 in FIG. 18 have been pivoted to their maximum in the same direction, resulting in a maximum curvature $C_M$ of the assembly 100. The maximum curvature $C_M$ is selected such that it is less than or equal to the maximum operating curvature $OC_M$ of the fibers and splices carried by the assembly 100.

Also shown in FIG. 18 is the maximum installation curvature $IC_M$, which corresponds to the maximum curvature of the assembly permitted when assembling the assembly 100 and routing the optical fibers therethrough. Thus, it should be appreciated that the assembly 100 must be assembled in a straighter configuration than that shown in FIG. 18; however, once assembled, the assembly 100 can be bent further into the curvature shown in FIG. 18. As discussed above, the pivoting flexibility of the modules (200, 300, 400) can facilitate aligning optical fibers carried by the trunk cable with destination telecommunications equipment.

A method of assembling a splice housing assembly having a front end and a back end in accordance with the present disclosure includes one or more of the following steps, which need not be performed in the sequence provided: providing first and second pieces of each of at least a cable attachment module, a plurality of splice housing modules, and a furcation module; and/or coupling a front portion of a first of the pieces of the cable attachment module to a back portion of one of the pieces of one of the splice housing modules; and/or serially coupling together the first pieces of the plurality of splice housing modules; and/or coupling a front portion of a first piece of a front-most of the splice housing modules to a rear portion of a first piece of the furcation module; and/or inserting a splice holder in each of the first pieces of the splice housing modules; and/or coupling a rear portion of the first piece of the cable attachment module to an end of a trunk cable carrying a plurality of optical fibers; and/or splicing a first subset of the optical fibers in a first of the splice holders to a first subset of fiber stubs; and/or passing a second subset of optical fibers through a bore of the first splice holder; and/or splicing the second subset of the optical fibers in a second of the splice holders to a second subset of fiber stubs; and/or passing the first set of fiber stubs through a bore of the second splice holder; and/or inserting a furcation cap in the first piece of the furcation module; and/or installing one or more furcation tubes in the furcation cap; and/or routing one or more stubs of the first subset and/or the second subset of fiber stubs through the one or more furcation tubes; and/or attaching the second of the pieces of the cable attachment module to the first of the pieces of the cable attachment module; and/or securing the cable attachment module to the trunk cable; and/or attaching the second piece of each of the splice housing modules to one of the first pieces of the splice housing modules; and/or attaching the second piece of the furcation module to the first piece of the furcation module; and/or injecting a gel into each of the splice housing modules via an injection port in each of the splice housing modules; and/or injecting a sealant in the furcation module via a closable port in the furcation module; and/or closing the closable port with a cover; and/or providing an anti-tamper sleeve around each of the furcation module and the splice housing modules.

In some examples, an assembly kit for a splice housing assembly in accordance with the present disclosure comprises: at least one pair of pieces 206a and 206b of a cable attachment module 200; and/or at least one pair of pieces 302a and 302b of a splice housing module 300; and/or at least one pair of pieces 402a and 402b of a furcation module 400; and/or at least one splice holder 500; and/or at least one splice protector 602; and/or at least one furcation cap 460; and/or at least one furcation tube 404; and/or at least one cover 480 for covering a coverable port 452 of the furcation module 400; and/or a filling material for injecting into a splice housing module 300 through an injection port 360 of the splice housing module 300; and/or a sealant for disposing in the furcation module 400 via the coverable port 452.

EXAMPLE EMBODIMENTS

According to a first embodiment of the present disclosure there is provided a kit for an optical fiber splice housing assembly comprising: at least one cable attachment module of the present disclosure; and/or at least one splice housing module of the present disclosure; and/or at least one furcation module of the present disclosure; and/or at least one splice holder of the present disclosure; and/or at least one splice protector; and/or at least one furcation cap; and/or at least one furcation tube; and/or at least one cover for covering a coverable port of a furcation module; and/or a filling material for injecting through an injection port of a splice housing module; and/or a sealant for disposing in a furcation module.

According to a second embodiment there is provided an optical fiber splice housing assembly having a front end and a back end and comprising: a fiber optic trunk cable carrying at least a first subset and a second subset of optical fibers; first and second subsets of fiber stubs; a cable attachment module of the present disclosure; at least two splice housing modules of the present disclosure; a furcation module of the present disclosure; at least two splice holders of the present disclosure; a furcation cap; and at least one furcation tube; wherein a rear portion of the cable attachment module is secured to an end of the trunk cable; wherein a front portion of the cable attachment module is pivotally coupled to a rear end of one of the splice housing modules; wherein the splice housing modules are serially pivotally coupled to one another; wherein a front portion of a front-most of the splice housing modules is pivotally coupled to a rear portion of the furcation module; wherein the one of the splice holders is disposed in each of the splice housing modules; wherein the furcation cap is installed in a front portion of the furcation module and the at least one furcation tube projects forwardly from the furcation cap; wherein each of the first subset of optical fibers is spliced at a splice to one of the first subset of fiber stubs in the splice holder of a first of the splice housing modules; wherein the second subset of optical fibers passes through a bore of the splice holder of the first of the splice housing modules; wherein each of the second subset of optical fibers is spliced at a splice to one of the second subset of fiber stubs in the splice holder of a second of the splice housing modules; wherein the first subset of fiber stubs passes through a bore of the splice holder of the second of the splice housing modules; and wherein each of the stubs of the first subset and second subset of fiber stubs is routed through one of the at least one furcation tubes.

According to a third embodiment there is provided the optical fiber splice housing assembly of the second embodiment, wherein each of the splices comprises a splice protector held by one of the splice holders.

According to a fourth embodiment there is provided the optical fiber splice housing assembly of the second or third embodiment, wherein a cover removably covers a coverable port of the furcation module;

According to a fifth embodiment there is provided the optical fiber splice housing assembly of any of the second through fourth embodiments, wherein a gel is injected in each of the splice housing modules; and wherein a sealant is injected in the furcation module.

According to a sixth embodiment there is provided a method of assembling an optical fiber splice housing assembly comprising: providing first and second pieces of each of at least a cable attachment module of the present disclosure, a plurality of splice housing modules of the present disclosure, and a furcation module of the present disclosure.

According to a seventh embodiment there is provided the method of the sixth embodiment, further comprising coupling a front portion of a first of the pieces of the cable attachment module to a back end of one of the pieces of one of the splice housing modules.

According to an eighth embodiment there is provided the method of the sixth or seventh embodiment, further comprising serially coupling together the first pieces of the plurality of splice housing modules.

According to a ninth embodiment there is provided the method of any of the sixth through eighth embodiments, further comprising coupling a front portion of a first piece of a front-most of the splice housing modules to a rear portion of a first piece of the furcation module.

According to a tenth embodiment there is provided the method of any of the sixth through ninth embodiments, further comprising inserting a splice holder of the present disclosure in each of the first pieces of the splice housing modules.

According to an eleventh embodiment there is provided the method of any of the sixth through tenth embodiments, further comprising coupling a rear portion of the first piece of the cable attachment module to an end of a trunk cable carrying a plurality of optical fibers.

According to a twelfth embodiment there is provided the method of the eleventh embodiment, further comprising splicing a first subset of the optical fibers in a first of the splice holders to a first subset of fiber stubs.

According to a thirteenth embodiment there is provided the method of the twelfth embodiment, further comprising passing a second subset of optical fibers through a bore of the first splice holder.

According to a fourteenth embodiment there is provided the method of the thirteenth embodiment further comprising splicing the second subset of the optical fibers in a second of the splice holders to a second subset of fiber stubs.

According to a fifteenth embodiment there is provided the method of the fourteenth embodiment, further comprising passing the first set of fiber stubs through a bore of the second splice holder.

According to a sixteenth embodiment, there is provided the method of any of the sixth through fifteenth embodiments, further comprising inserting a furcation cap in the first piece of the furcation module.

According to a seventeenth embodiment there is provided the method of the sixteenth embodiment, further comprising installing one or more furcation tubes in the furcation cap.

According to an eighteenth embodiment there is provided the method of the seventeenth embodiment, further comprising routing one or more stubs of the first subset and/or the second subset of fiber stubs through the one or more furcation tubes.

According to a nineteenth embodiment, there is provided the method of any of the sixth through sixteenth embodiments, further comprising attaching the second of the pieces of the cable attachment module to the first of the pieces of the cable attachment module.

According to a twentieth embodiment there is provided the method of any of the eleventh through eighteenth embodiments, further comprising securing the cable attachment module to the trunk cable.

According to a twenty-first embodiment there is provided the method of any of the sixth through twentieth embodiments, further comprising attaching the second piece of each of the splice housing modules to one of the first pieces of the splice housing modules.

According to a twenty-second embodiment there is provided the method of any of the sixth through twenty-first embodiments, further comprising attaching the second piece of the furcation module to the first piece of the furcation module.

According to a twenty-third embodiment there is provided the method of the twenty-first embodiment, further comprising injecting a gel into each of the splice housing modules via an injection port in each of the splice housing modules.

According to a twenty-fourth embodiment there is provided the method of the twenty-second embodiment, further comprising injecting a sealant in the furcation module via a closable port in the furcation module.

According to a twenty-fifth embodiment there is provided the method of the twenty-fourth embodiment, further comprising closing the closable port with a cover.

According to a twenty-sixth embodiment, there is provided the method of any of the sixth through twenty-fifth embodiments, further comprising providing an anti-tamper sleeve around each of at least the furcation module and the splice housing modules.

From the foregoing detailed description, it will be evident that modifications and variations can be made in the devices of the disclosure without departing from the spirit or scope of the invention.

What is claimed is:

1. An optical fiber splice housing assembly, comprising:
a cable attachment module being adapted to couple the assembly to an end of a trunk cable carrying a plurality of optical fibers, the cable attachment module comprising a shell defining a cavity for receiving portions of the optical fibers;
a furcation module being adapted to route the optical fibers via a plurality of furcation tubes disposed in a furcation cap, the furcation cap being housed in the furcation module, the furcation module comprising a shell defining a cavity for receiving portions of fiber stubs that are spliced to the optical fibers; and
a plurality of splice housing modules serially disposed between the cable attachment module and the furcation module, each of the splice housing modules having an interior cavity defined by an interior surface, each of the splice housing modules being pivotally coupled to at least one other of the splice housing modules, each of the splice housing modules being adapted to accommodate a splice holder having a splice holder body defining a plurality of channels for holding splices for at least one, but less than all, of the optical fibers and being further adapted to provide an annular clearance between the interior surface of each splice housing module and a corresponding splice holder.

2. The optical fiber splice housing assembly of claim 1, wherein at least one of the cable attachment module, the furcation module, and the splice housing modules comprises two complementary housing pieces forming a pair of housing pieces that are fastenable together.

3. The optical fiber housing assembly of claim 2, wherein each pair of the complementary housing pieces comprises a ridge and a complementary groove, the ridge of one of the housing pieces in each pair of housing pieces being nestable in the groove of the other of the housing pieces of the pair.

4. The optical fiber housing assembly of claim 2, wherein each pair of the complementary housing pieces comprises at least one flexibly resilient latch and at least one bar, each of the at least one latch of one of the housing pieces in each pair of housing pieces being fastenable to one of the at least one bar of the other of the housing pieces in the pair.

5. The optical fiber splice housing assembly of claim 1, wherein each of the cable attachment module, the furcation module, and the splice housing modules comprises two complementary housing pieces forming a pair of housing pieces that are fastenable together.

6. The optical fiber splice housing assembly of claim 5, wherein one or more of the splice housing modules comprises at least one notch in the shell, the at least one notch being adapted to receive a tool for separating the two housing pieces of the splice housing module.

7. The optical fiber splice housing assembly of claim 5, wherein the furcation module comprises at least one notch in the shell, the at least one notch being adapted to receive a tool for separating the two housing pieces of the furcation module.

8. The optical fiber splice housing assembly of claim 1, wherein the cable attachment module comprises a plurality of crimp legs configured to crimp the trunk cable, and wherein each of the crimp legs comprises at least one rib on an inner surface of the crimp leg.

9. The optical fiber splice housing assembly of claim 1, wherein one or more of the splice housing modules comprises at least one injection port for injecting a fluid substance into an interior of the shell of the splice housing module.

10. The optical fiber splice housing assembly of claim 1, wherein the furcation module comprises a holding area, the holding area including an annular rib for receiving a corresponding groove of a furcation cap.

11. The optical fiber splice housing assembly of claim 1, wherein the furcation module comprises at least one port in the shell, the at least one port being adapted to access a central portion of the cavity of the furcation module.

12. The optical fiber splice housing assembly of claim 11, further comprising a cover for each of the at least one port.

13. The optical fiber splice housing assembly of claim 12, wherein each of the at least one cover comprises a latch adapted to lockingly engage a lip bordering at least a portion of one of the at least one port.

14. The optical fiber splice housing assembly of claim 1, wherein a first of the splice housing modules is pivotally coupled to the cable attachment module by a ball and socket joint.

15. The optical fiber splice housing assembly of claim 14, wherein a second of the splice housing modules is pivotally coupled to the furcation module by a ball and socket joint.

16. The optical fiber splice housing assembly of claim 14, wherein each of the ball and socket joints is defined by a maximum pivot amplitude.

17. The optical fiber splice housing assembly of claim 16, wherein the maximum pivot amplitude corresponds to a curvature of the housing assembly that is less than or equal to a maximum operating curvature of the optical fibers.

18. The optical fiber splice housing assembly of claim 14, wherein the ball portion of each ball and socket joint is hollow and has an open front end such that the cavities of each of the cable attachment module, the furcation module, and the plurality of splice housing modules are in longitudinal communication with one another.

19. The optical fiber splice housing assembly of claim 1, wherein each pair of adjacent splice housing modules are pivotally coupled to each other by a ball and socket joint.

20. The optical fiber splice housing assembly of claim 1, wherein each of the splice housing modules houses a splice holder, and wherein the annular clearance allows the splice holder to undergo at least one of translational or rotational movement within the cavity of the corresponding splice housing module.

21. The optical fiber splice housing assembly of claim 1, wherein the cavities of each of the cable attachment module, the furcation module, and the plurality of splice housing modules are in longitudinal communication with one another.

22. The optical fiber splice housing assembly of claim 1, wherein the splice holder is positioned in the cavity of one of the splice housing modules, the splice holder including:
   a front face;
   a back face opposing the front face; and
   a wall, the wall comprising an inner surface that defines a longitudinal bore extending from the front face to the back face, the wall further comprising an outer surface that supports the plurality of channels, the plurality of channels being arranged circumferentially around at least a portion of the wall, each channel being defined by a pair of spaced apart arms extending from the outer surface of the wall.

23. The optical fiber splice housing assembly of claim 22, wherein the wall is flexibly resilient, and comprises a first end and a second end opposite the first end that reversibly abut each other at an openable and closable junction.

24. The optical fiber splice housing assembly of claim 23, wherein the junction is openable for installing one or more optical fibers in the longitudinal bore.

25. The optical fiber splice housing assembly of claim 22, including a plurality of the splice holders positioned in the cavities of a plurality of the splice housing modules.

26. The optical fiber splice housing assembly of claim 1, wherein at least one of the cavities of the splice housing modules is filled with a gel.

* * * * *